United States Patent [19]

Uyeda et al.

[11] 4,345,855

[45] Aug. 24, 1982

[54] SELF PROPELLED DYNAMICALLY POSITIONED REEL PIPE LAYING SHIP

[75] Inventors: Stanley T. Uyeda, Orange; E. John Radu, Fountain Valley; William J. Talbot, Jr., Corona Del Mar; Norman Feldman, Huntington Beach, all of Calif.

[73] Assignee: Santa Fe International Corporation, Orange, Calif.

[21] Appl. No.: 264,958

[22] Filed: May 18, 1981

Related U.S. Application Data

[60] Division of Ser. No. 35,216, May 2, 1979, Pat. No. 4,269,540, which is a continuation-in-part of Ser. No. 903,181, May 5, 1978, abandoned.

[51] Int. Cl.³ .......................... F16L 1/00; B63B 35/04
[52] U.S. Cl. ...................... 405/168; 405/166
[58] Field of Search ................ 405/154–172; 226/172, 171; 242/158 R, 157.1, 254

[56] References Cited

U.S. PATENT DOCUMENTS

| | | | |
|---|---|---|---|
| Re. 28,410 | 5/1975 | Cox et al. | 405/172 X |
| 2,660,382 | 11/1953 | Wilson | 242/158 R |
| 3,237,438 | 3/1966 | Tesson | 405/168 X |
| 3,372,461 | 3/1968 | Tesson | 405/168 X |
| 3,630,461 | 12/1971 | Sugasti et al. | 242/54 R |
| 3,641,778 | 2/1972 | Gibson | 405/168 |
| 3,680,342 | 8/1972 | Mott et al. | 405/168 |
| 3,712,100 | 1/1973 | Key et al. | 72/161 |
| 3,822,559 | 7/1974 | Matthews et al. | 405/166 |
| 3,982,402 | 9/1976 | Lang et al. | 405/168 |
| 4,243,345 | 1/1981 | Cha et al. | 405/168 |

Primary Examiner—Dennis L. Taylor
Attorney, Agent, or Firm—LeBlanc, Nolan, Shur & Nies

[57] ABSTRACT

A self propelled reel pipe laying ship having forward, midship and stern sections, and having a reel mounted at the midship section thereof about a substantially horizontal axis of rotation extending transversely of the ship, such that the load of the reel is distributed downwardly and outwardly substantially in the direction of the longitudinal axis of the ship, the ship further including pipe conditioning means located at the stern section for movement about a pivot axis extending substantially parallel to the rotational axis of the reel and (a) radius control means for imparting a substantially uniform curve to the pipe after it is unspooled from the reel, (b) straightening means for imparting a reverse bending force to the pipe opposite the curvature imparted to the pipe by the reel, and (c) means for guiding the pipe into the water after it emerges from the straightening means; and means for pivoting the pipe conditioning means about its pivot axis to adjust the pipe entry angle at which pipe enters the water after passing through the pipe guide means.

26 Claims, 58 Drawing Figures

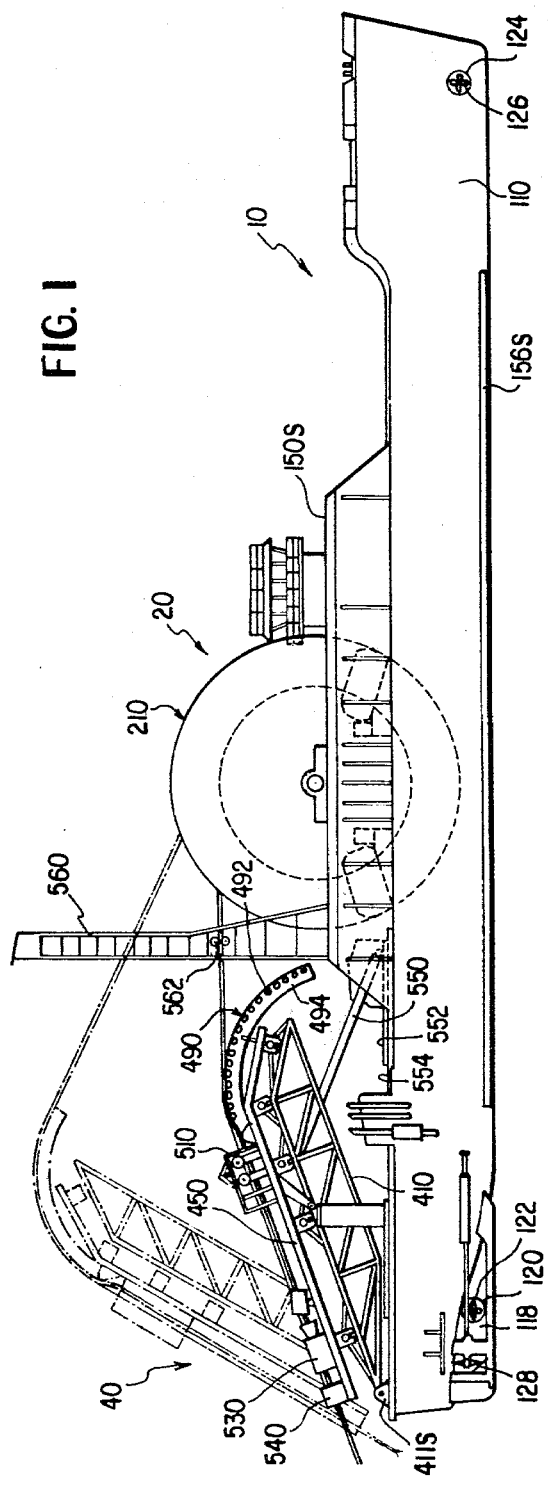
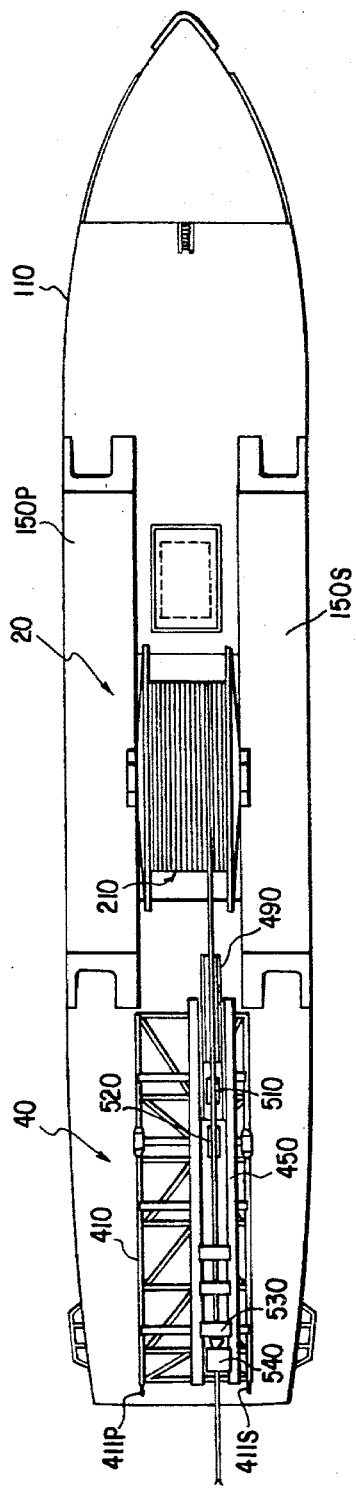

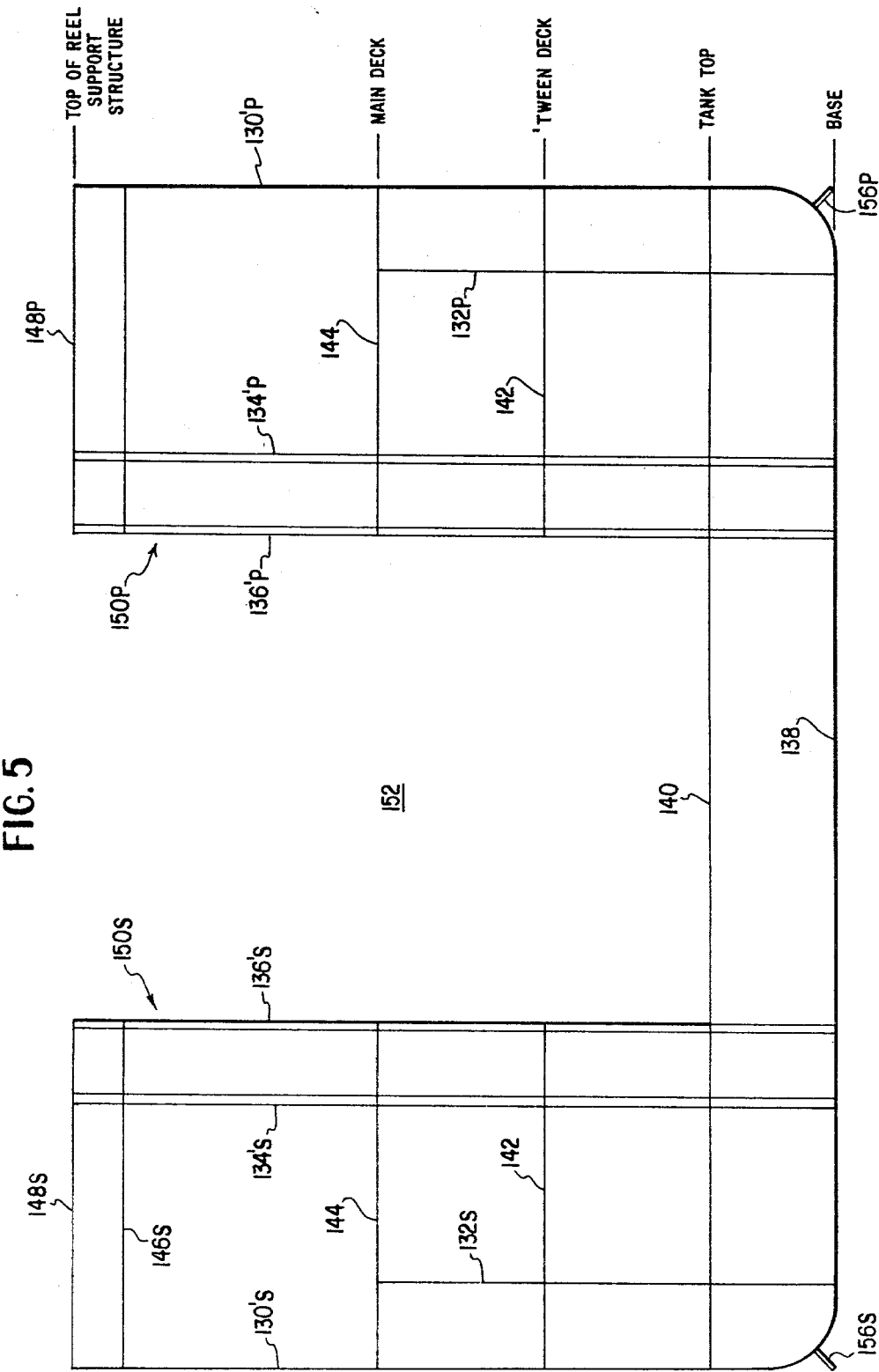

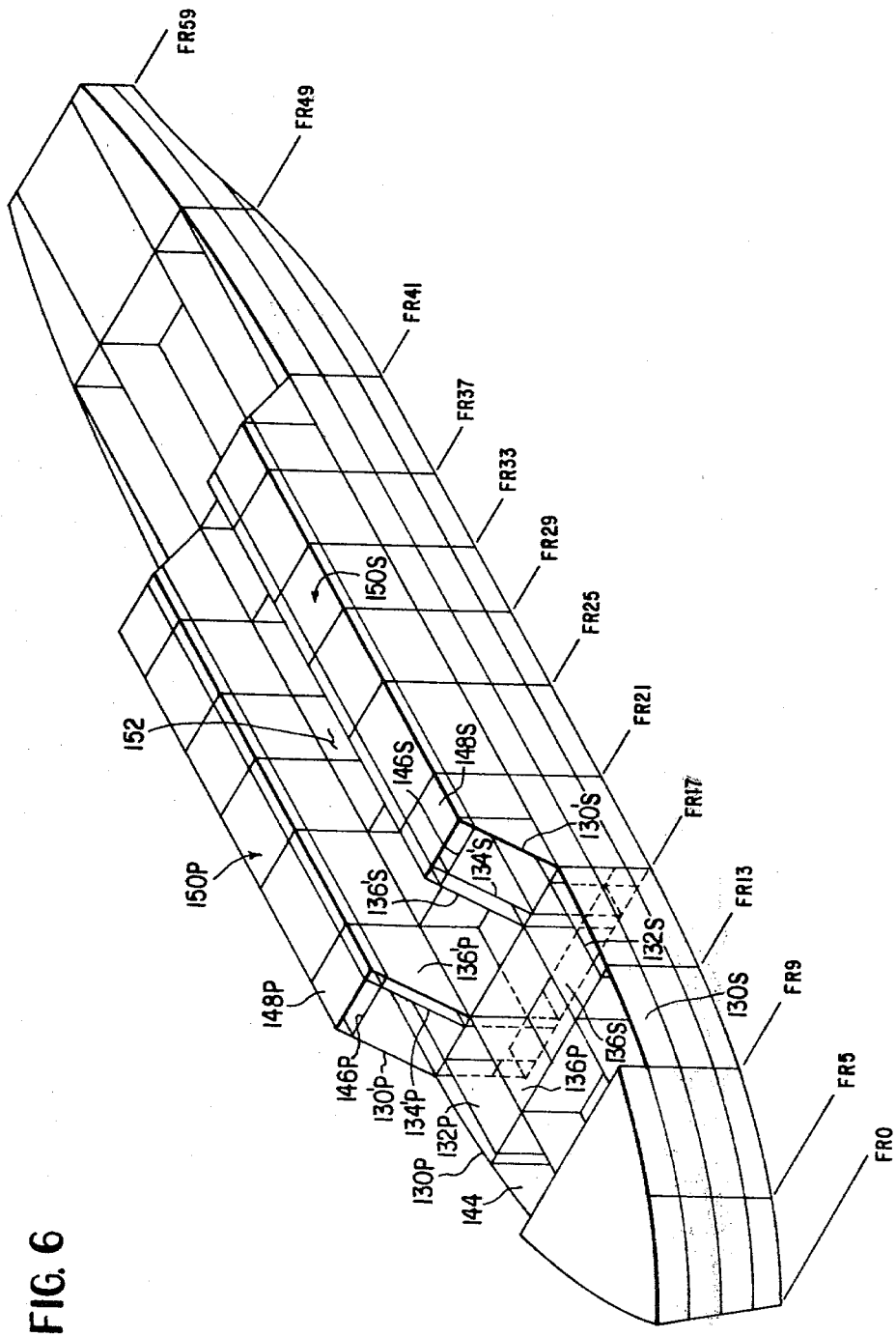

FIG. 8A
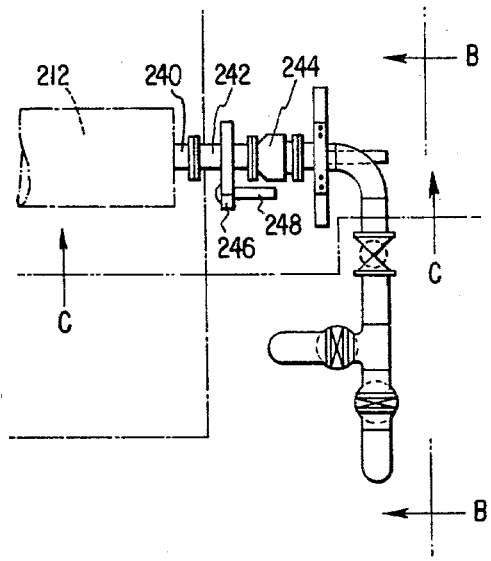
FIG. 8B
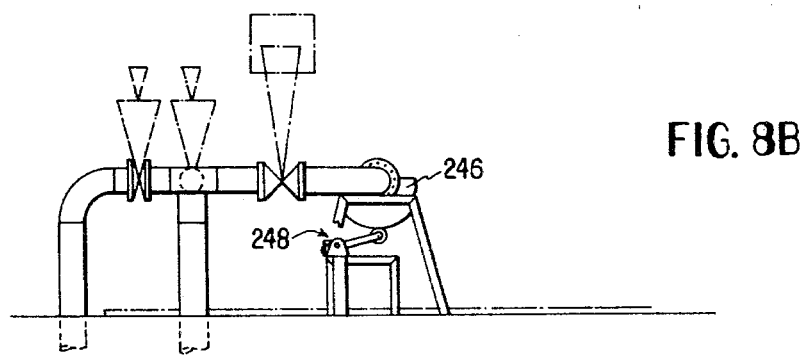
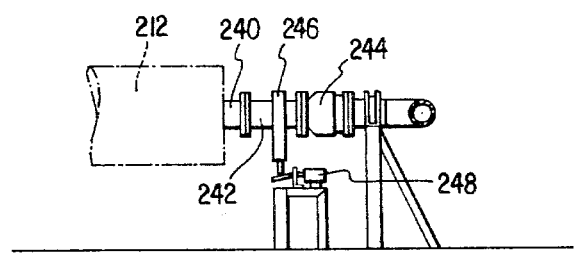
FIG. 8C

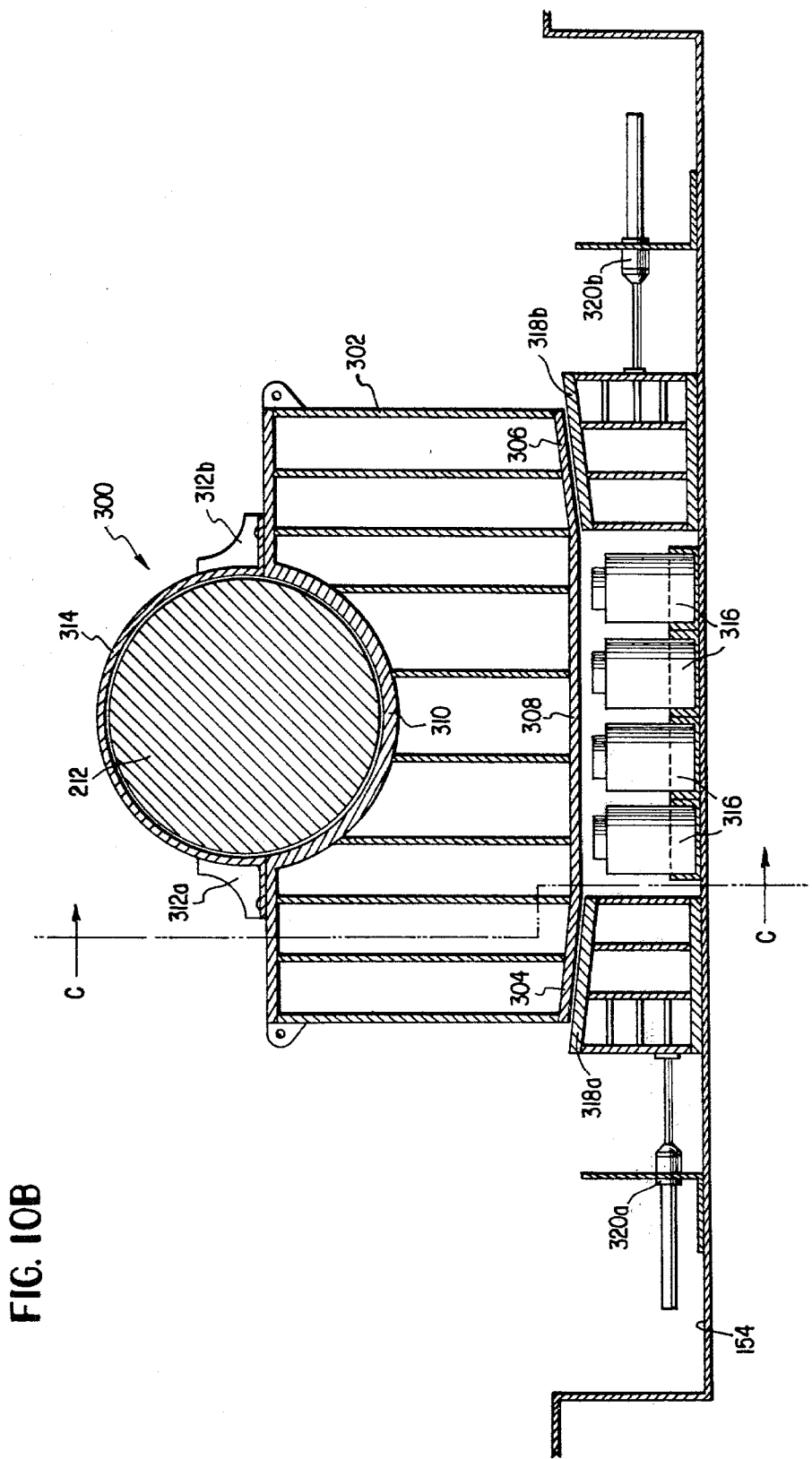

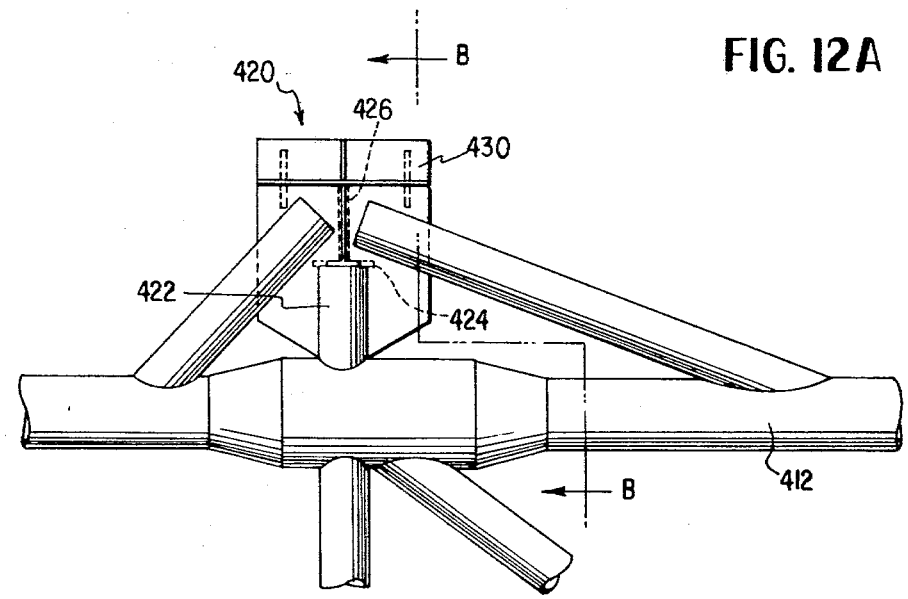
FIG. 12A
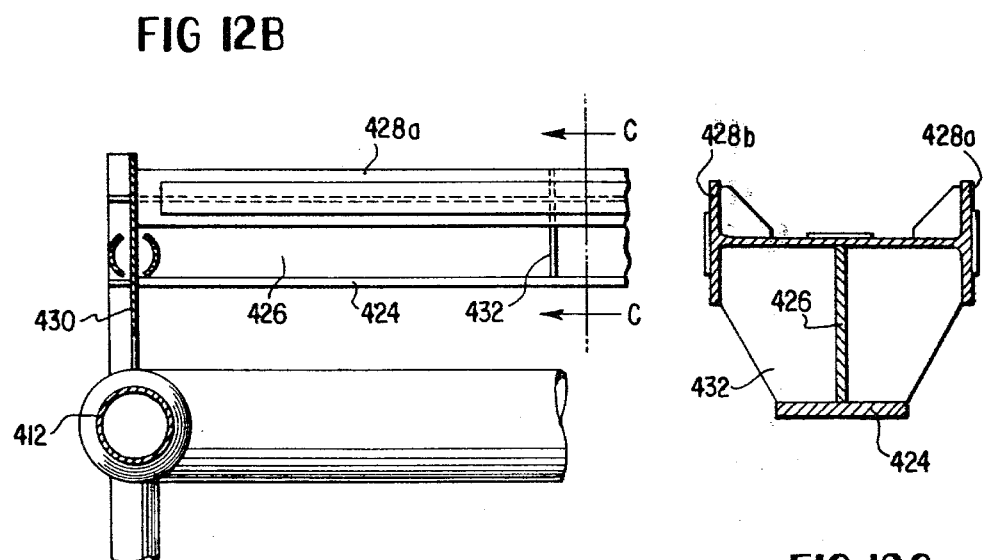
FIG 12B
FIG. 12C

FIG. 14C
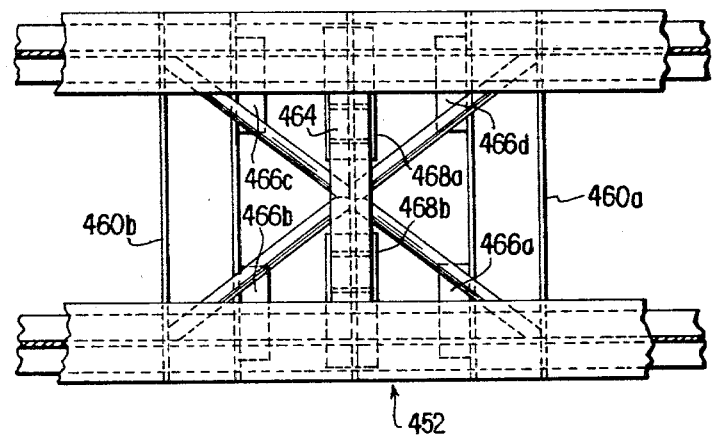
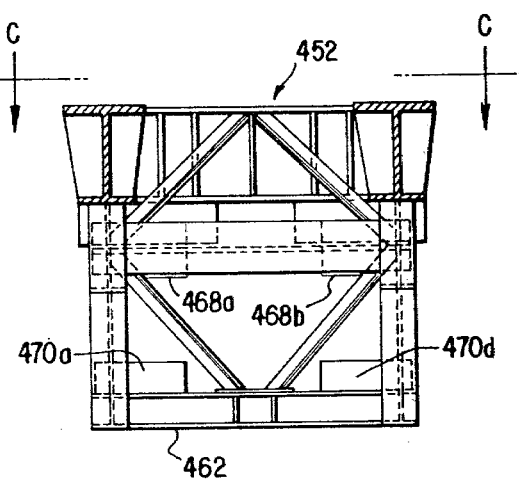
FIG. 14B
FIG. 14A
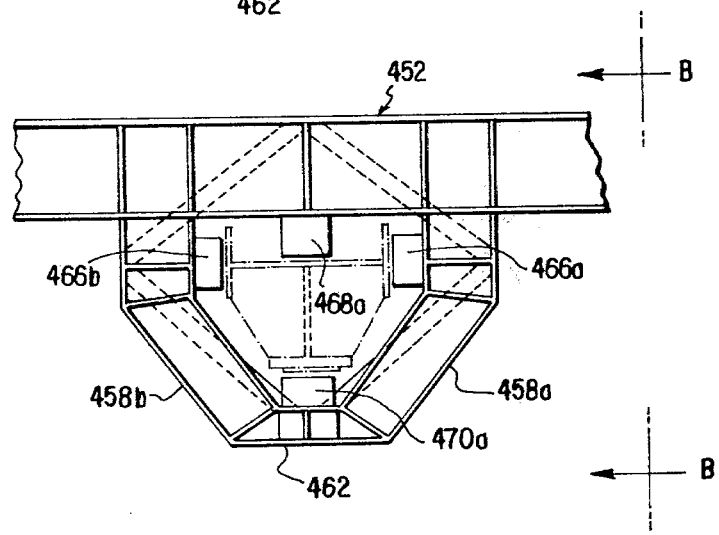

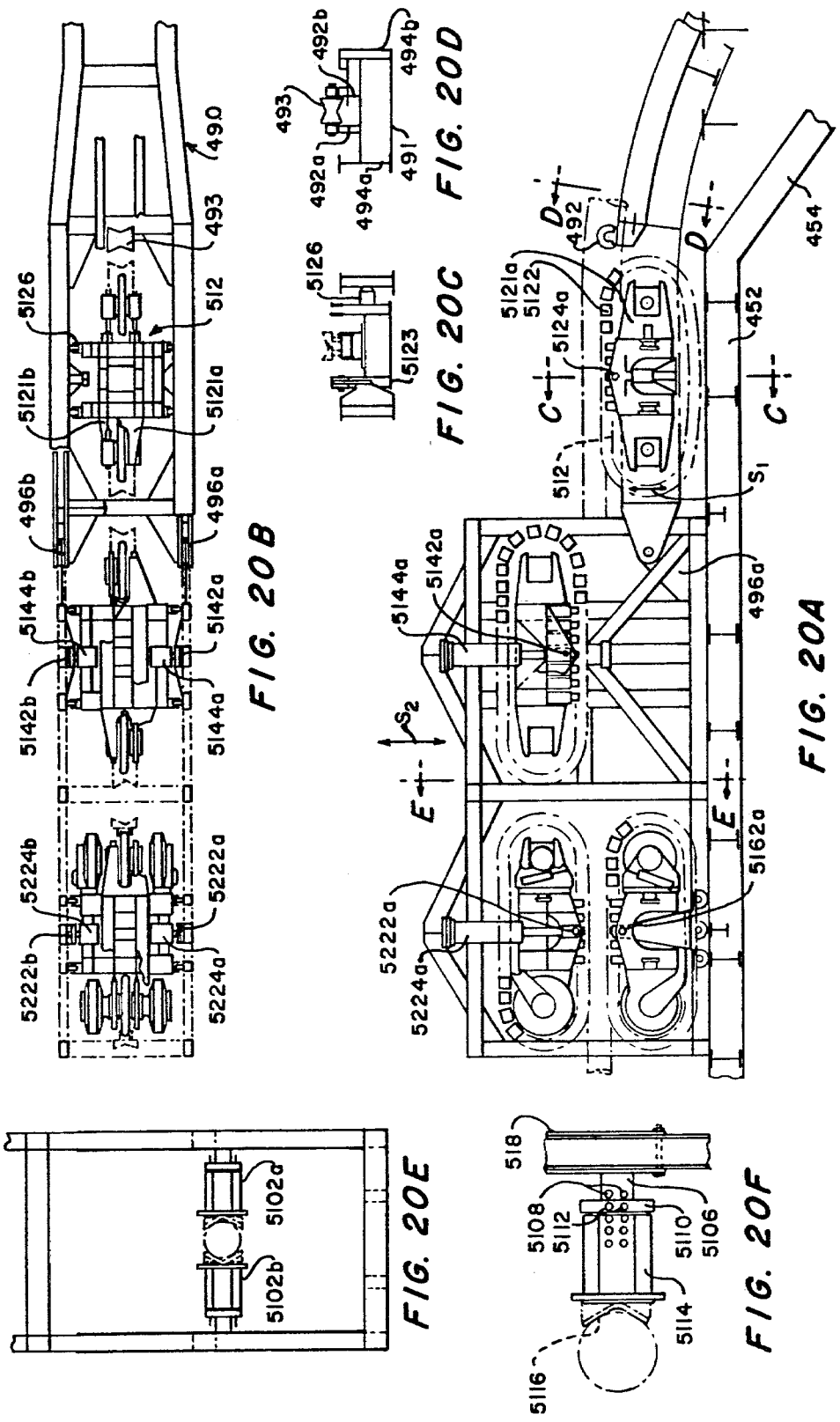

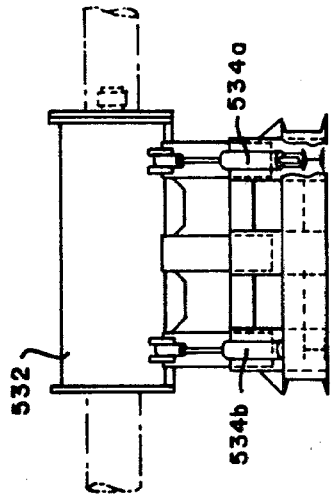
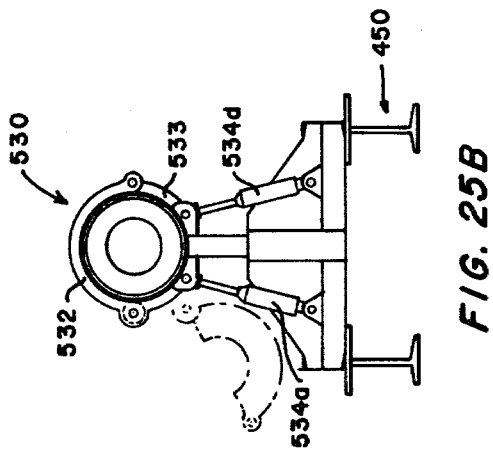
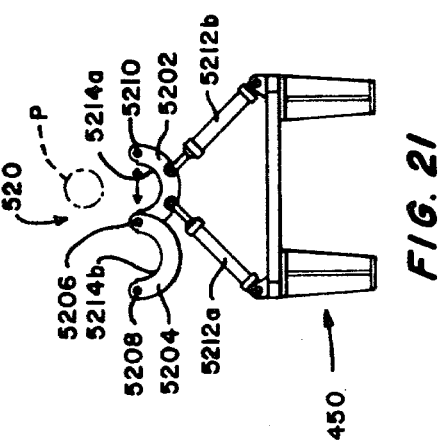
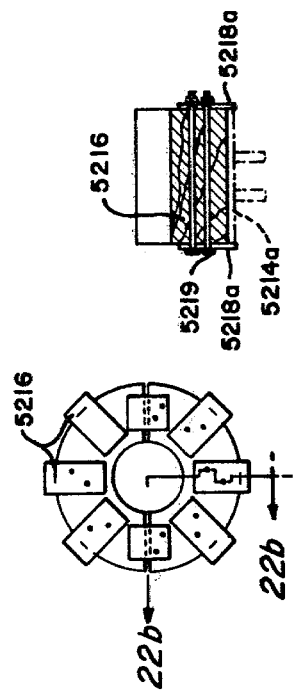

SELF PROPELLED DYNAMICALLY POSITIONED REEL PIPE LAYING SHIP

CROSS REFERENCE TO RELATED APPLICATIONS

This is a division of application Ser. No. 35,216, filed May 2, 1979, now U.S. Pat. No. 4,269,540, which is a continuation-in-part of Ser. No. 903,181, filed May 5, 1978, now abandoned, the disclosure of which is expressly incorporated herein by reference as though fully set forth below.

This application is related to a commonly assigned application Ser. No. 903,180, filed May 5, 1978 by Charles N. Springett et al of similar title herewith, now Patent No. 4,230,421.

BACKGROUND OF THE INVENTION

1. Field of the Invention

This invention relates to a reel pipelaying vessel. More particularly, the invention pertains to a new type of ship, specifically a self-propelled, dynamically-positionable reel pipelaying ship, in which a pipe spooling reel and associated pipe handling equipment are integrated into the ship's construction.

The vessel of this invention has been specifically designed to accommodate a permanently mounted pipe spooling reel substantially larger than any other pipe spooling reel heretofore known or used and capable of spooling substantially larger size pipe than any heretofore used.

2. History of the Prior Art

In laying offshore subsea pipelines for such uses as the gathering of oil and/or gas from offshore subsea wells, as, for example, in the Gulf of Mexico, it has been conventional to use one of two main methods to lay the pipe. In the first, or "stovepiping" method, a pipeline is fabricated on the deck of a lay barge by welding together individual lengths of pipe as the pipe is paid out from the barge. Each length of pipe is about 40' or 80' long. Thus, the pay-out operation must be interrupted periodically to permit new lengths of pipe to be welded to the string. The stovepiping method requires that skilled welders and their relatively bulky equipment accompany the pipelaying barge crew during the entire laying operation; all welding must be carried out on site and often under adverse weather conditions. Further, the stovepiping method is relatively slow, with experienced crews being able to lay only one to two miles of pipe a day. This makes the entire operation subject to weather conditions which can cause substantial delays and make working conditions quite harsh.

The other principal conventional method is the reel pipelaying technique, in this method, a pipeline is wound on the hub of a reel mounted on the deck of a lay barge. Pipe is generally spooled onto the reel at a shore base. There, short lengths of pipe can be welded under protected and controlled conditions to form a continuous pipeline which is spooled onto the reel. The lay barge is then towed to an offshore pipelaying location and the pipeline spooled off the reel between completion points. This method has a number of advantages over the stovepiping method, among them, speed (one to two miles per hour); lower operating costs (e.g., smaller welding crews and less welding equipment must be carried on the lay barge); and less weather dependency.

Historically, the technique of laying undersea fluid-carrying pipelines had its rudimentary beginnings in England in the 1940's. In the summer of 1944, 3" nominal bore steel tubes, electrically flash-welded together, were coiled around floating drums. One end of the pipe was fixed to a terminal point; as the floating drums were towed across the English Channel, the pipe was pulled off the drum. In this manner, pipeline connections were made between the fuel supply depots in England and distribution points on the European continent to support the allied invasion in Europe. (See Blair, J. S., "Operation Pluto: The Hamel Steel Pipelines", Transactions of the Institute of Welding, Feb. 1946).

The broad concept of reel pipelaying was also disclosed in British Pat. No. 610,103 (Ellis), issued Apr. 28, 1948, wherein it was suggested that lengths of pipe be joined together at the manufacturing plant and coiled onto a drum, mounted on a barge or ship; the loaded barge would then be moved to the desired marine location and the pipe unwound from the drum by fixing one end of the pipe and towing the barge away from the fixed location.

While the concepts described in British Pat. No. 601,103 and those actually used in Operation Pluto were adequate for wartime purposes; no known further development work or commercial use of the technique of laying pipe offshore from reels was carried out after World War II. After a hiatus of about fifteen years, research into the reel pipelaying technique was renewed and was carried on by Gurler, Herbert & Co., Inc. of New Orleans, La.; by 1961, Gurler, Herbert had sufficiently advanced the reel pipelaying technique to make it a commercially acceptable and viable method of laying pipe in the offshore petroleum industry, able to compete with the traditional stovepiping technique. The first known commercial pipelaying reel barge, called the U-303, was built by Aquatic Contractors and Engineers, Inc., a subsidiary of Gurtler, Herbert, in 1961. The U-303 utilized a large vertical axis reel, permanently mounted on a barge and having horizontally oriented flanges (generally referred to in the trade as a "horizontal reel"). A combined straightener-level winder was employed for spooling pipe onto the reel and for straightening pipe as it was unspooled. The U-303 first laid pipe commercially in Sept., 1961, in the Gulf of Mexico off the coast of Louisiana and was used successfully during the 1960's to lay several million linear feet of pipe of up to 6" diameter. The U-303 reel pipelaying barge is described in U.S. Pat. No. 3,237,438 (Tesson) and U.S. Pat. No. 3,372,461 (Tesson), both assigned to the assignee of the invention hereof.

The successor to the U-303, currently in use in the Gulf of Mexico and known in the trade as the "Chickasaw", also utilizes a large horizontal reel, permanently mounted to the barge such that it is not readily movable from one carrier vessel to another. Various aspects of "Chickasaw" are described in the following U.S. patents, all assigned to the assignee of the invention hereof:

Sugasti, et al.—U.S. Pat. No. 3,630,461
Gibson—U.S. Pat. No. 3,641,778
Mott, et al.—U.S. Pat. No. 3,680,432
Key, et al.—U.S. Pat. No. 3,712,100

Commercial reel pipelaying techniques require the use of certain pipe handling equipment in addition to the reel. Among such pipe handling equipment essential to any commercial reel pipelaying system is a straightener mechanism. This may take the form of a series of rollers or tracks, or any other arrangement which imparts sufficient reverse bending force to the pipe to remove residual curvature so that after unspooling, the pipe will lay substantially straight on the sea bottom. No such pipe-conditioning apparatus was used in Operation Pluto or contemplated by the British Ellis patent.

U.S. Pat. No. 3,982,402 (Lang, et al.) describes an apparatus for laying pipe from a vertical reel in which the pipe conditioning apparatus is pivotable to adjust the lift-off angle of the pipe relative to the horizontal (e.g., the deck of a ship) as a function of the water depth in which the pipe is being laid. This has distinct commercial advantages, especially where the reel pipelaying system is incorporated into a self-propelled ship, such as that of the present invention, capable of traveling to different job sites, having different pipe size and/or lay depth requirements.

An early concept for a reel pipelaying ship is described in Goren, et al., "The Reel Pipelay Ship—A New Concept" Offshore Technology Conference Proceedings, May 1975 (Paper No. OTC 2400). This paper (hereafter the Goren, et al. 1975 OTC Paper) describes advantages and operating features of a proposed reel pipelaying ship. However, the cost of construction of a ship as described there was estimated to be on the order of $100,000,000; by contrast the ship of the herein described invention is currently under construction at less than one-third that estimate. The research and development work for the ship described in the Gorne et al paper, (done at great expense by or on behalf of the assignee of this application) was subsequently materially revised in numerous major respects, and substantial changes and improvements were made to achieve the design of the substantially different reel pipelaying ship described hereinafter; this new reel ship is or will be materially different in concepts, construction features, mode of operation and results compared with the ship described in the Goren et al paper.

SUMMARY OF THE INVENTION

There is an increasing need in the offshore petroleum industry to lay pipelines in deep and rough water, singly and in multiple pipeline bundles, and in remote areas far from supply bases. The dynamically-positioned pipelaying reel ship of this invention represents a new and different approach to meeting these needs.

The fact that the reel ship of this invention is self-propelled substantially eliminates the need for support vessels, such as tugs and supply boats, required by known pipelaying barges of either the stovepiping or reel laying type. In addition, the reel ship is highly mobile and has the capability of laying pipe in remote areas far from any supply base.

The reel ship also has an advantage in being able to discharge pipe in deep water where it is extremely difficult or impossible for conventional stovepiping or reel barges to operate. This is due to the adjustable ramp assembly which mounts the pipe conditioning apparatus at the stern of the ship; the ramp assembly is adjustable to allow pipe to enter the water at very steep angles (up to about 60°) while conventional barges are limited to about a 15° entry angle. This allows the reel ship to work without a stinger, which is required by conventional barges; elimination of the stinger contributes to the ability of the reel ship to work in rough weather.

A principal feature of the reel ship of this invention lies in its hull construction. In order to support the load of the reel and its full complement of pipe, the ship utilizes a novel design which increases its longitudinal strength, supports the reel at a height to accommodate the largest permitted reel size, and increases the covered deck storage area.

Another feature of the reel ship is its use of the reel hub as a ballast compartment. In order to keep vessel roll motion to a minimum and to ensure that the main propellers and thrusters are submerged sufficiently to allow efficient and non-cavitational operation, the draft must be maintained constant at or near the load line draft as pipe is spooled off. To achieve this, ballast water must be added to the hull during the unspooling operation. If the water is added to the ballast tanks in the double bottom, the overall center of gravity of the ship (KG) is lowered with a resulting increase in statical stability, conveniently represented by GM. Increasing GM, and thus increasing ship's stability, decreases the natural period of roll and hence increases the roll motion that will be experienced in sea conditions in which it is desirable to be able to operate. In order to minimize this increase in GM, as pipe is unspooled from the reel, water ballast can be added to a ballast compartment located within the reel hub in such amount as to partially or wholly compensate for the weight of pipe being offloaded.

For convenience, the following terms may be employed in the description of this invention:
1. A "turn" is that length of pipe wound through one complete revolution of the reel;
2. A "warp" comprises a plurality of turns making up a layer of pipe wound on the reel across the full or substantially full width of the reel.

Other features and advantages of the reel ship of this invention will become apparent from the following detailed description of a preferred embodiment.

BRIEF DESCRIPTION OF THE DRAWINGS

FIG. 1 is a starboard side elevation of a preferred embodiment of the reel ship;

FIG. 2 is a top plan view of the reel ship of FIG. 1;

FIG. 5 is a midship cross-section of the reel ship hull through, e.g., frame FR 25, in FIGS. 3 and 4;

FIG. 6 is a perspective of the skeletal structure of the reel ship hull with main deck and 'tween deck plating removed between frames FR 9 and FR 49;

FIG. 8A is a top plan view of one embodiment of the vent conduit system of the reel ballast system;

FIG. 8B is a view along lines B—B in FIG. 8A;

FIG. 8C is a view along lines C—C in FIG. 8A;

FIG. 10B is a sectional elevation of the unloading mechanism taken along lines B—B in FIG. 10A;

FIG. 12A is a side elevation of one level wind track shown in box 12 in FIG. 11B;

FIG. 12B is a view of the starboard portion of the ramp and level wind track looking aft, taken along line B—B in FIG. 12A;

FIG. 12C is a section of the level wind track taken along line C—C in FIG. 12B;

FIG. 14A is a starboard side elevation of one level wind roller carriage assembly shown in box 14 in FIG. 13B;

FIG. 14B is a view of the level wind roller carriage assembly looking aft, taken along line B—B in FIG. 14A;

FIG. 14C is a plan view of the level wind roller carriage assembly taken along line C—C in FIG. 14B;

FIGS. 20A-B are side and plan views, respectively, of the straightener/tensioner assembly;

FIGS. 20C-D are sectional views taken through sections C—C and D—D in FIG. 20A respectively;

FIG. 20E is a sectional view of the straightener assembly frame taken through line E—E in FIG. 20A;

FIG. 20F is a detail of one tensioner pipe clamp assembly;

FIG. 21 is a transverse view of the pipe tie in clamp assembly;

FIG. 22A shows a typical tie in clamp insert;

FIG. 22B is a sectional view taken through line B—B in FIG. 22A;

FIGS. 25A-B are starboard side and transverse views, respectively, of the main pipe clamp assembly.

FIGS. 1-5, 7A, & B, 10A-10C, 11A, 11B, 12A-12C, 13A, 13B, 14A-14C, 19, 20A-20F, 21, 22A, 22B, 23A, 23B, 24A, 24B, 25A, 25B and 26A-26C are taken from construction layout drawings and are drawn substantially to scale. Within each of these figures, the component parts or elements are substantially in proportion.

DESCRIPTION OF THE PREFERRED EMBODIMENT

1. Hull Construction (FIGS. 1-6)

Figure 3:
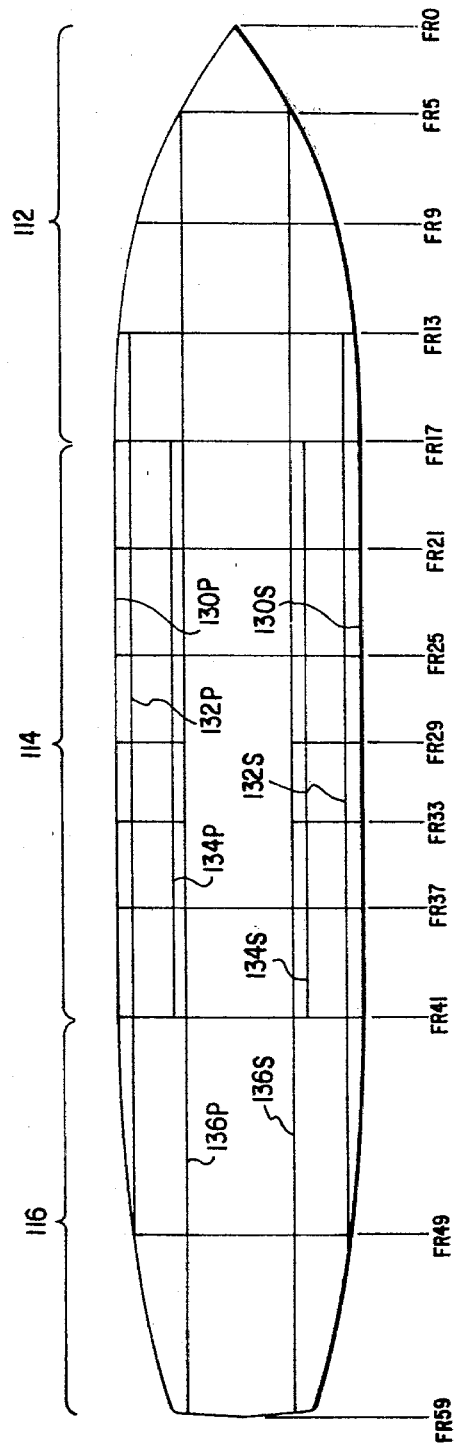
FIG. 3 is a plan view of the main inner bottom hull structure of the embodiment of FIG. 1.
Figure 4:
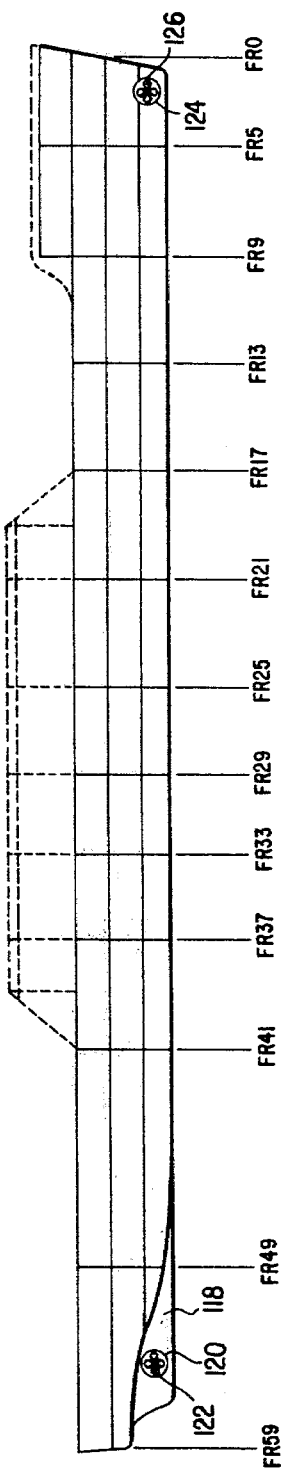
FIG. 4 is a profile of the main hull structure of the embodiment of FIG. 1 with the shell plating removed.

The reel ship, generally designated 10, is designed to carry a main pipe-spooling reel system and its associated support and drive assemblies, generally designated 20, and pipe conditioning equipment, generally designated 40, located aft of the reel system assemblies 20.

The ship's hull, generally designated 110, comprises a forward section 112, a midship section 114, and a stern section 116. The ship construction is referenced primarily to frames (designated FR) which locate hull structural members in transverse planes. The forward section 112 is defined approximately between frames FR 0 and FR 17; the midship section 114 which carries the reel assemblies 20, lies approximately between frames FR 17 and FR 41; and the stern section 116, which mounts the pipe conditioning equipment 40, lies approximately between frames FR 41 and FR 59.

The stern section 116 preferably includes, on its underside a skeg 118 which serves to increase stern buoyancy, to protect the main propellers 128, such as from floating or submerged objects or from grounding in shallow water, and to provide housing for a stern thruster or thrusters 122; and to improve directional stability of the vessel. The skeg, which consists of a substantially wedged shaped structure after part of the ship's keel, is an advantageous but not essential feature of the reel ship. It is particularly useful to increase stern buoyancy at relatively shallow draft, on the order of about 13'-15', and where the size of the ship may be limited by economic and/or practical considerations, such as the need to be able to negotiate canals or ship channels of relatively limited size.

Advantageously, the skeg is so sized that, at high draft, it contributes between about 1.41% and 2.1% of the ship's buoyancy; at low draft, it contributes between about 1.04% and 1.48% of the ship's buoyancy (see Table I below).

TABLE I

| SHIP DIMENSIONS | | SKEG BUOYANCY (as % of total ship buoyancy) | |
|---|---|---|---|
| Ship Length (L) | Skeg Width ($W_s$) | High Draft (13') | Low Draft (18') |
| 385' | 16' | 1.48 | 1.04 |
| 400' | 16' | 1.41 | 0.99 |
| 400' | 24' | 2.1 | 1.48 |

The skeg also advantageously houses one or more thruster tunnels 120 for stern thrusters 122. The bow section 112 houses one or more thruster tunnels 124 for bow thrusters 126. One embodiment contemplates the use of two bow and two stern thrusters. The bow and stern thrusters, which are reversible, assist in course and station keeping by giving the reel ship lateral or transverse positioning capability, while main props 128 provide fore and aft drive and, in conjunction with the ship's rudders, positioning capability.

As an alternative to tunnel-mounted thrusters, as shown, 360° rotatable azimuthal thrusters may be utilized; such azimuthal thrusters are extendable below the hull for use and are retracted into the hull when the vessel is underway or entering shallow draft area. Azimuthal thrusters would be a likely alternate when a skeg is not built into the ship.

It is intended that the thrusters (whether of the tunnel or azimuthal type) be manually controllable to allow the operator to maintain the ship on a desired course, especially during a pipelaying operation. If the operator determines that the ship is too far to the right or left of the desired course, he can apply a manual correction using the thrusters; the result is a manually controlled dynamic positioning of the ship. By the addition of suitable equipment, the dynamic positioning control may be made automatic.

Figure 16:
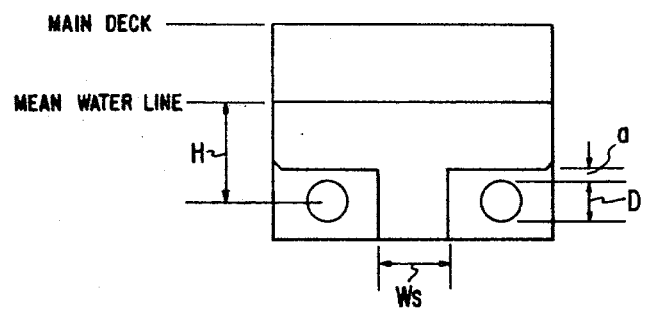
FIG. 16 is a schematic of the skeg and props of the ship.

The location of the propellers with respect to the hull bottom provides advantages in terms of efficiency of operation as well. In particular, referring the FIG. 16, the propellers must be so located with respect to the load line to avoid cavitation; this is a function of the prop diameter (D, in feet) and the distance (H, in feet) from the mean water line at a given ship's draft to the center of the prop. A second factor relates to the location of the prop with respect to the hull bottom to minimize vibration; this is a function of the prop diameter (D) and the distance (a, in feet) between the hull bottom and periphery of the prop.

It has been found that H should be 1.125 D; preferably the ratio H:D is in the range of about from 0.625:1 to 1.125:1 between vessel high and low draft conditions, respectively. The distance "a" between the hull bottom and the tip of the propeller blades should be not less than 0.2 D; "a" is preferably between about 0.2 D and 0.4 D, and more preferably is about 0.1215 D.

FIGS. 3-6 show the primary structural arrangement of the ship. The reel pipelaying ship of this invention utilizes a novel reel support structure and multiple bulkhead box-beam construction in the midship section of the vessel to support the weight of the fully loaded reel.

American Bureau of Shipping (ABS) regulations require that primary structural elements be continuous for the length and/or breadth and/or height of the vessel. In the reel ship of this invention, such primary structural elements include outer longitudinal hull walls 130 (corresponding elements on the starboard and port sides are designated "S" and "P", respectively) and a double longitudinal bulkhead arrangement comprising longitudinal bulkheads 134 and 136 which lie interiorly of a single bulkhead 132 between frames FR 17 and FR 41.

Longitudinal bulkheads 136 run substantially the length of the ship between frames FR 5 and FR 59. Hull walls 130 bulkheads 134, 136 extend vertically from the baseline (hull bottom) to the main deck level except between frames FR 19 and FR 39 where midship portions, generally designated 130′, 134′ and 136′, respectively, extend upwardly to the top of the reel support structure. Bulkheads 130′, 134′, and 136′ taper to the main deck level at their fore ends between frames FR 19 and FR 17 and at their aft ends between frames FR 39 and FR 41.

Single bulkheads 132 which are not generally considered as primary structural members, lie interiorly of and are spaced from the outer hull walls 130 between frames FR 13 and FR 49 (which includes the midship section between frames FR 17 and FR 41). Longitudinal bulkheads 132 extend vertically from the baseline to the main deck level throughout their length.

In the transverse direction, primary ship structural members which also form part of the reel support structure include web frames FR 17, FR 21, FR 25, FR 37, and FR 41. Additional fore and aft primary transverse structural members include web frames FR 5, FR 9, FR 13, FR 49, and FR 59. Web frames FR 5–FR 59 extend vertically from the baseline to the main deck level of the ship. All of the transverse bulkheads, except those comprising frames FR 29 and FR 33, extend across the entire beam of the ship. The bulkheads comprising web frames FR 29 and FR 33 extend transversely only between the outer hull walls 130 and the innermost longitudinal bulkheads 136. A space or well 152 in the midship section is thereby defined for receiving a pipe carrying the reel 210; this reel well 152 is bounded by the bulkheads comprising web frames FR 25 and FR 37 fore and aft, respectively and longitudinal bulkheads 136S and 136P.

In normal ship construction, the frame spacing is maintained substantially equal throughout. In the reel ship of this invention, the mid-section frame spacing is shortened between frames FR 25–FR 37 to accommodate the large weight of the reel. In one embodiment, for example, the reel weighs about 800 tons and is capable of carrying a full load of between 1,500 and 2,000 short tons of pipe.

Horizontal members of the hull structure include the baseline 138, the tank top 140, the 'tween deck 142, and the main deck 144. The tank top 140 extends across the entire beam of the ship and longitudinally between the bow and about frame FR 52.

A pair of horizontal midship structural members 146 and 148 extend transversely between the outer hull wall 130 and inner double longitudinal bulkhead 136 above the main deck 144; midship structural members 146 and 148 extend longitudinally between frames FR 19 and FR 39. Upper member 148 also advantageously comprises the lifeboat deck.

The main deck 144, lower and upper midship horizontal structural members 146 and 148, respectively, and the portions 130′, 134′, 136′ of outer hull wall 130 and outer and inner double longitudinal bulkheads 134 and 136 respectively, between main deck 144 and upper midship horizontal structural member 148 comprise a box-beam reel support structure, generally designated 150, which sits atop the main deck level in the midship section between web frames FR 19 and FR 39, with the ends tapering to web frames FR 17 and FR 41, respectively.

The box-beam reel support structure 150 comprises a highly advantageous feature of this invention. One of the primary problems of a reel ship relates to the large concentrated load applied at the middle of the ship by the main reel. Substantially the entire reel load is concentrated in two bearings, one on each side, which cover a relatively small part of the ship's length. If the ship is considered as being poised on two wave crests, one at each end of the ship, the reel load concentrated on the bearings creates a large sagging or bending moment at the middle of the ship which drops off rapidly in the fore and aft directions. It is necessary to counteract this large bending moment in the center. Normally, at least a substantial part of this bending moment would be counteracted by the main deck and 'tween deck hull structure. However, the continuity of main deck 144 and 'tween deck 142 in the reel ship is lost due to the reel well 152 located in the middle of the ship just in the region where the bending moment counteracting forces are required. Due to this discontinuity in the main deck and 'tween deck structure, there is insufficient section modulus in the ship to react the bending moment created by the reel.

The problem of adequately reacting the bending moment due to the reel imparted load is solved in the present invention by the box-beam reel support structure 150. The overall structure of a vessel can be considered as a composite longitudinal I-beam in which the double bottom of the hull comprises the bottom flange and the main deck is the upper flange. In the reel ship of this invention, the bottom flange is continuous, whereas the upper flange is broken by the reel well. The upper flange at the point of maximum bending moment has been moved up to the top of the box section 150 and the webs are comprised of hull walls 130 and double bulkheads 134, 136; the latter distribute the shear load of the reel downwardly and outwardly in the planes of the bulkheads 134, 136 to the bottom flange.

Because the bending moment due to the reel load is so peaked and drops off rapidly in the fore and aft directions, the box-beam support structure 150 need not extend more than the minimum required by classification society (e.g., ABS) regulations. In particular, the box-beam 150 need not extend the entire length of the ship. The length of the box-beam 150 (in this case the distance between frames FR 17 and FR 41) need only be at least about 0.4 L, where L is the length of the ship. This is a highly advantageous feature of this invention because it reduces the amount of space required for the support system (which space is useable for other purposes) and reduces the overall cost of the vessel substantially.

By virture of the fact that the support structure 150 comprises a box-beam located above and resting on the main deck level, the shear load is spread out from the reel into the structure of the ship in the fore and aft directions. The box-beam structure 150 in conjunction with the other hull members transmit the shear load from the reel 210 efficiently into the rest of the hull and ultimately into the shell plate (baseline 138) in such a way as not to exceed the load limits of the shell plate and so that the shear forces can be resisted by the buoyancy forces on the shell plate.

The double bulkhead-box-beam construction used in the reel ship of this invention has a number of advantages, including:

1. Increasing the section modulus of the ship in the middle by the use of relatively little additional structure; the box-beam distributes the reel load through the ship so as to maintain the stress on the primary structural members well within maximum allowable stress limits for the materials used, according to pertinent classification society requirements. As a corollary, for the sagging condition the box-beam 150 maintains the compressive stress in the top flange and tensile stress in the bottom flange of the composite longitudinal beam of the vessel structure within maximum allowable limits.

2. Supporting the rotational axis of reel 210 axis at the height required to accommodate the largest permitted reel size (based on maximum pipe diameter and length to be carried by the ship). This avoids construction of a much larger ship and results in substantial cost savings.

3. Providing a longitudinal passageway between bulkheads 134 and 136 for access to compartments such as storage and/or personnel cabins located between the bulkheads 134 and bulkheads 132.

4. Creating additional enclosed spaces for winches and other equipment, including, for example, the diving equipment. This additional space was made available by the discovery that it was not necessary to extend bulkhead 132 vertically to the full height of the box-beam structure 150. Rather, it was discovered that by advantageously having longitudinal bulkheads 134, 136 span the reel bearing support blocks (described below), substantially all of the effective load is transmitted through bulkheads 134, 136 to the lower composite beam flange (i.e., the double bottom of the ship's hull). Thus, a vertical extension of bulkhead 132 became superfluous.

In addition to the above-discussed advantageous features of the construction of the reel ship, other new and desirable features, as follows, are also apparent and are useable in preferred embodiments.

One of the advantageous features of the reel ship is its ability to operate in relatively shallow draft areas. The ship is designed to draw as little as 13'-14' of water, thereby enabling it to operate in essentially unlimited areas, including such as Australian waters, where sand bars limit vessel drafts to about 13 feet. Equally, or more important, the reel ship can operate out of shallow water ports, such as assignee's reel pipelaying shore base at Houma, La. Generally, a reel shore base requires a fairly large expanse of dock area. The land at deepwater ports is generally at a premium; shallow water port land is much less costly. Thus, there are economic and commercial advantages to a ship which can operate out of a shallow water base.

As a consequent of its shallow draft capability, provision must also be made for ballasting the ship down to its operating draft. This is advantageously accomplished by the double bottom hull design, in which the tank top 140 is spaced about twice the normal distance from the baseline 138 (normal spacing is about 3.5'; whereas in a preferred embodiment of this ship, the spacing is on the order of 7'). Space is thereby created for sufficient ballast to sink the ship to its desired normal operating draft (e.g., about 18 feet).

The space between bulkheads 132 and outer hull members 130 is void so that the construction of the major part of the vessel is equivalent to a double hull arrangement, at least between frames FR 13 and FR 49. This provides good reserve damage stability to the ship.

1a. Vessel Characteristics

An important hydrostatic characteristic of the reel ship that affects its hydrodynamic characteristics (i.e., that has an effect on its motion in waves) is its GMT (i.e., the vertical distance (in feet) from its center of gravity to the transverse metacenter of the ship). GMT changes with changes in the vessel load; generally GMT increases as the ship becomes lighter, i.e., as vessel load and draft decrease.

If the GMT of the vessel is too small, the vessel becomes statically unstable; slight shifts in weight, e.g., as the booms of cranes mounted on the vessel are swung around, will cause the vessel to heel a substantial and highly undesirable amount, possibly up to 10°. On the other hand, if the GMT of the vessel is too large, the ship becomes too stiff and the roll will be too great for acceptable operating conditions for personnel and equipment in prevailing seas.

In the reel ship of this invention, over 2,000 tons of pipe may be offloaded during a laying operation. As pipe is payed out from the ship, and the ship becomes lighter, the GMT will increase. If no adequate compensation is made for the removed pipe weight, the GMT could increase to the point where the pipelaying operation may have to be terminated prematurely because of excessive rolling action of the ship. In other words, without appropriate compensation, the reel ship would be limited to a more restricted range of operating sea conditions.

For example, consider vessel displacement at full load to be about 13,000 tons with an operating draft of about 18 feet. If no ballast is added after offloading the pipe, the vessel displacement will be around 11,000 tons and the draft will be 15 feet, resulting in the vessel being raised 3 feet out of the water. The GMT of the vessel changes from about 5.5 feet to about 13.3 feet, in an increase of about 7.8 feet. (See Table II below, which compares the approximate GMT of the vessel under full load, half load and empty reel conditions, where no reel ballast is added and where ballast is added to the reel hub (or core) as pipe as unspooled). This increases roll stability of the vessel so that the ship becomes stiffer about the roll axis and increases the rate of roll of the vessel. Equally, if not more importantly, such decrease in draft reduces the efficiency of the main props and thrusters and increases the cavitation problem, as noted above.

The change in GMT of the vessel, from about 5 feet to nearly 14 feet as the pipe weight goes from 2,000 tons to 0 tons, would be a large change for a vessel of this type and size. In practical effect, this would be detrimental to the safety and comfort of personnel, to on-deck equipment, to overall ship operations, to the pipe-laying operation in particular, and to the reel itself (due to excessive loading of the bearings and other reel support elements).

In order to maintain relatively constant displacement of the ship as pipe is payed out, ballast can be added in a conventional manner to hull ballast tanks (e.g., between the baseline and tank top). Although such bottom ballast will keep the draft at about 18 feet, the center of gravity of the vessel will shift downwardly as ballast is added. The result will be a change in GMT which may be outside acceptable commercial operating limits for the safety of personnel and equipment in prevailing seas.

In order to maintain commercially acceptable motion characteristics, it is a requirement that the GMT of this vessel be maintained within 25% of its initial height, which for commercial purposes, should not be more than about 7 feet, although a change of between 25% and 30% can be tolerated during the unreeling operation, and a greater change tolerated in calm sea conditions. Once a nominally optimum GMT for the vessel is determined, it is then desirable to maintain the change in this GMT as small as possible and at least within acceptable limits to avoid the overstability and excessive motion problems noted above.

Figure 17:
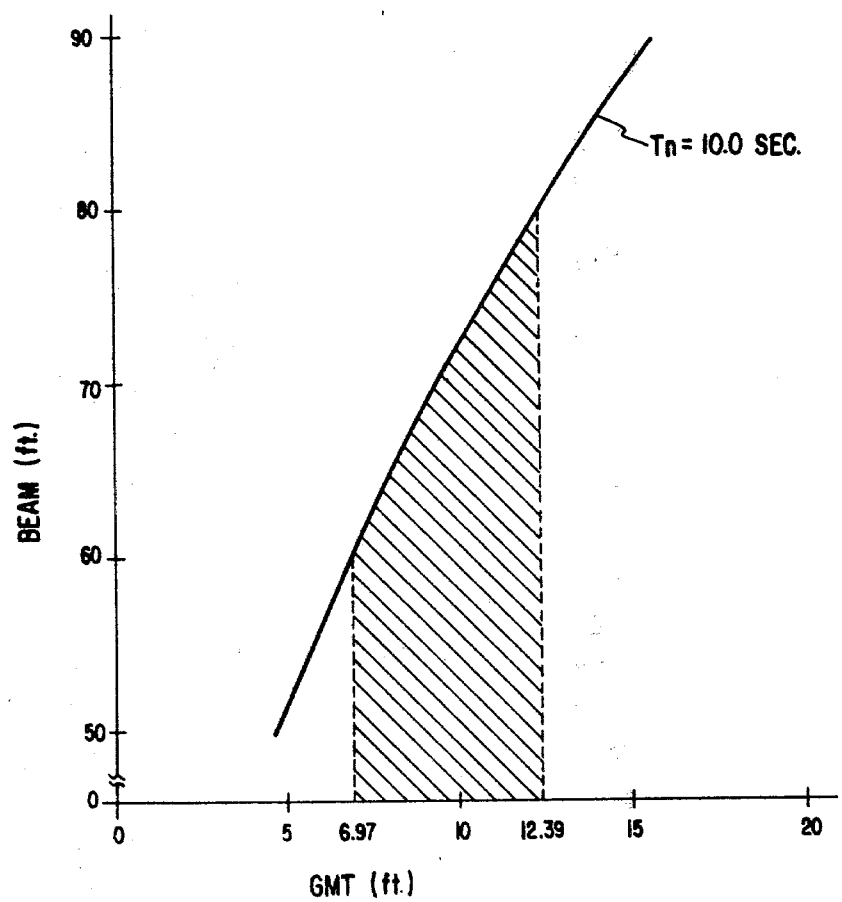
FIG. 17 is a graph which represents the relationship between a reel ship's beam and GMT.
Figure 18:
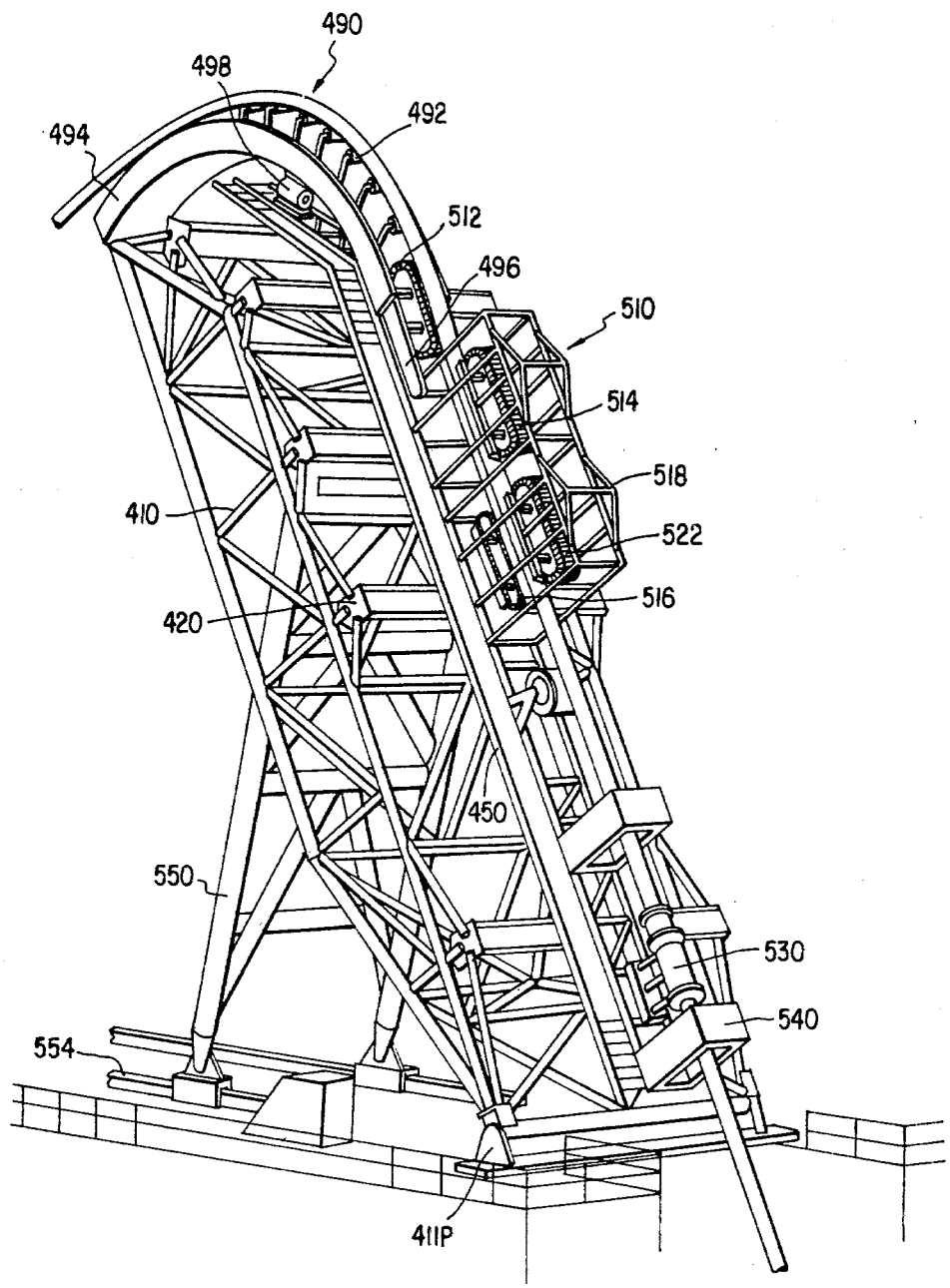
FIG. 18 is a perspective view looking forward of the pipe handling equipment.

For sea conditions in which normally expected maximum wave periods are in the range of about 5-8 seconds, the GMT (in feet) of such a reel ship should be no greater than $0.00194B^2$, where B is the beam (in feet) of the vessel. FIG. 17 shows the relationship between GMT and beam B for a natural vessel period $T_n$ of 10.0 sec., a commercially advantageous minimum period. The shaded area under the curve represents maximum commercially acceptable values of GMT for a reel ship of this invention. Advantageously and preferably, the GMT of the reel ship should be between about 3 feet and 8 feet under all significant offshore operating conditions. In order to maintain this GMT range, it has been found highly advantageous and preferable to provide ballast compensation at the level of the reel, and particularly in the reel hub, as pipe is unspooled (see Table II below).

TABLE II

| Reel Load | GMT(in feet) | |
|---|---|---|
| | without core ballast | with core ballast |
| Full | 5.51 | 5.51 |
| one-half | 10.22 | 6.68 |
| empty | 13.26 | 7.60 |

It is desirable that the hub be sufficiently large to accommodate enough ballast to maintain the change in GMT within commercially acceptable limits. In one preferred embodiment, the reel has a capacity to spool up to about 2,000 tons of pipe; the hub can hold up about 1,600 tons of ballast. The remaining necessary ballast can be added to conventional hull tanks without adversely increasing the change in GMT of the ship.

In addition to the above-mentioned advantage of minimizing the change in GMT as the pipe is offloaded during a lay operation, the use of reel or core ballast has other advantages to the ship of this invention. For example, if the ship is carrying only a partial load of pipe, ballast can be added to or removed from the reel core to change the natural roll period of the ship and thereby reduce its roll motion. In this way, the GMT of the ship can be changed to adjust for varying sea conditions; in particular, the natural roll period of the ship can be changed, as necessary, with respect to prevailing wave periods to prevent resonance conditions from occurring.

The reel ship, with no reel load but with sufficient bottom ballast to achieve its operating draft of about 18 feet, has a very high GMT (with a concomitant short natural period). This results in a tendency of the ship to whip with high acceleration and deceleration forces. By adding ballast to the reel core, the GMT of the ship can be decreased to detune the vessel and create longer, slower roll periods, i.e., the natural period of the ship is increased.

Additionally, or alternatively, the vessel roll may be damped by the use of bilge keels 156 and/or flume tanks (not shown). The bilge keels 156 are provided along the parallel mid-body of the vessel on the turn of the bilge as an aid in cutting down on ship's roll; preferably these keels should not extend beyond the outer projected horizontal and vertical vessel surfaces at least in part as protection against breaking off.

With respect to other vessel characteristics, it has been found that the length of the ship should be preferably between about 385′ and 410′; the beam is preferably between about 60′ and 80′ and more preferably between about 68′ and 73′. The ratio of beam (B) to draft (D) is preferably in the range of about 2.25:1-4.00:1 and more preferably in the range of 3.5:1-4.0:1.

2. Reel Assembly (FIGS. 7-10)

The pipe spooling reel system 20 comprises a reel 210 located near the longitudinal center of buoyancy, which is near the longitudinal geometric center of the vessel.

Reel 210 (see FIGS. 7A-B) is comprised of a central axial shaft, generally designated 212. Axially opposite flanges, generally designated 214S, 214P, extend radially outwardly from shaft 212. A hub, generally designated 216, co-axial with shaft 212, extends between flanges 214S and 214P. Each flange 214 is composed of a plurality of radial arms 218 extending from the shaft 212 outwardly to the flange rim. Typically, radial arms 218 may be spaced 30° apart around the circumference of the shaft 212. A further plurality of shortened radial reel arms 220, which extend radially outwardly from the surface of hub 216 to the flange rim, are located between adjacent arms 218.

The reel hub 216 comprises a circumferentially and axially continuous outer surface covering 222 extending between flanges 214S and 214P. A plurality of annular spacers 224 extend from the interior face of hub surface covering 216. The other ends of annular spacers 224 are secured (e.g., by welding) to transverse bracing members 226 which extend between opposed flanges 214S and 214P. Web plates 228 lie in radial planes between the interior surface of hub covering 216 and transverse bracing members 226 and between adjacent annular members 224. This interior construction of the reel results in a criss-cross or honeycomb structure under the plating 222 of hub 216. Such construction produces a reel with great strength necessary to accommodate large back tension forces which may occur during pipe laying and/or pipe spooling and/or pipe retrieval operations. Such back tension forces produce a wedging action between adjacent turns of pipe in a wrap which cause large splitting forces to develop in the reel flanges 214.

Advantageously and preferably the ratio of the diameter of the reel (at the flange rim) to the width of the reel hubs for the reel ship is in the range of between about 3:1 and 4:1, more preferably, this ratio is in the range of about 3.5:1–3.8:1; still more preferably such ratio is about 3.7:1. In the preferred embodiment designed for construction, the reel diameter is about 82 feet and the hub width is about 22 feet.

2a. Reel Ballast System

An important and advantageous feature of this invention lies in the fact that the interior of the hub 216 comprises a water-tight compartment to which ballast may be added as pipe is spooled off the reel. This ballast system requires means for supplying ballast, advantageously sea water, to the reel hub while the reel is rotating, at the same time providing means for venting the hub.

Figure 7A:
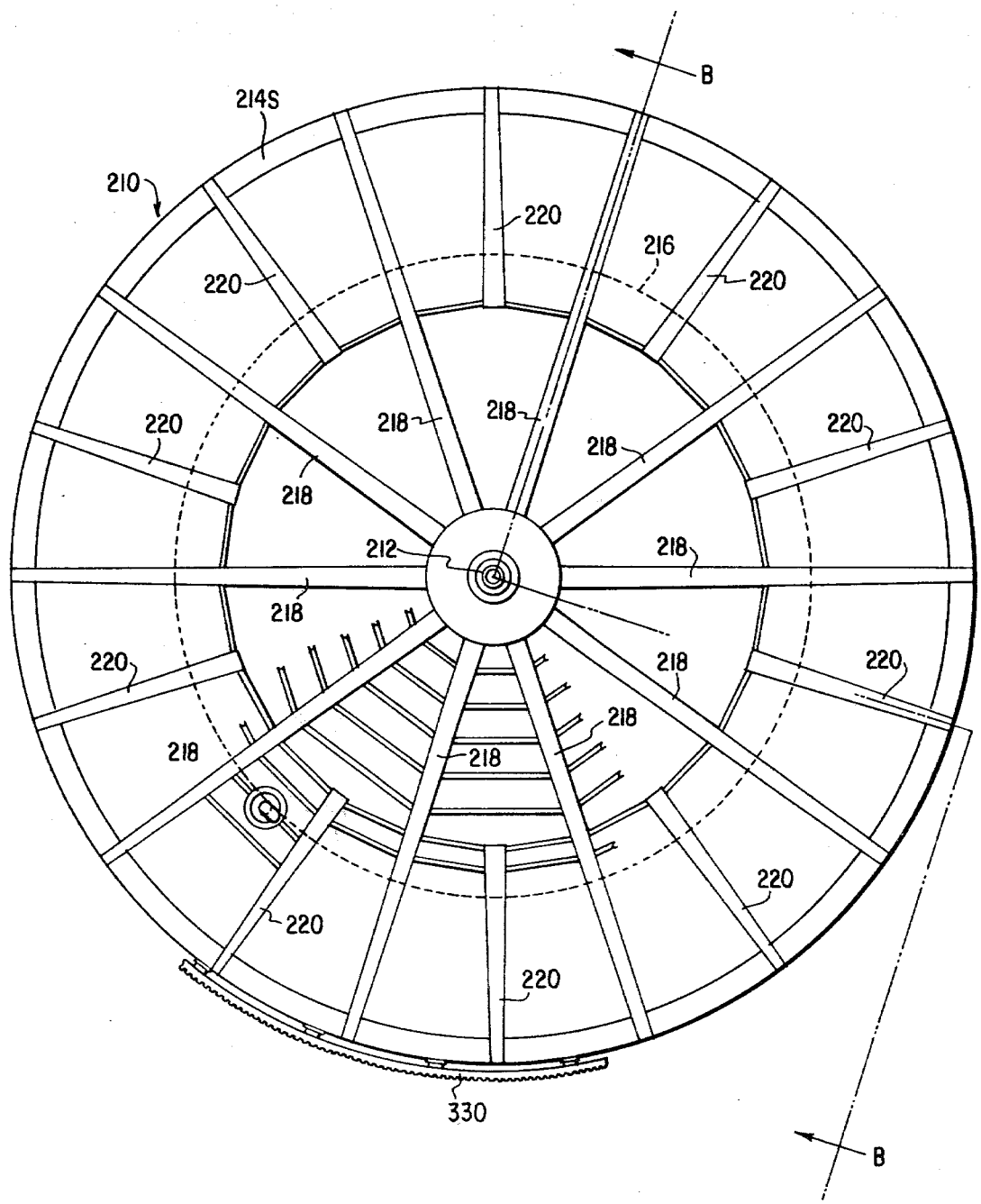
FIG. 7A is a starboard elevation of the pipelaying reel partly in section to show internal bracing, taken along lines A—A in FIG. 7B.
Figure 7B:
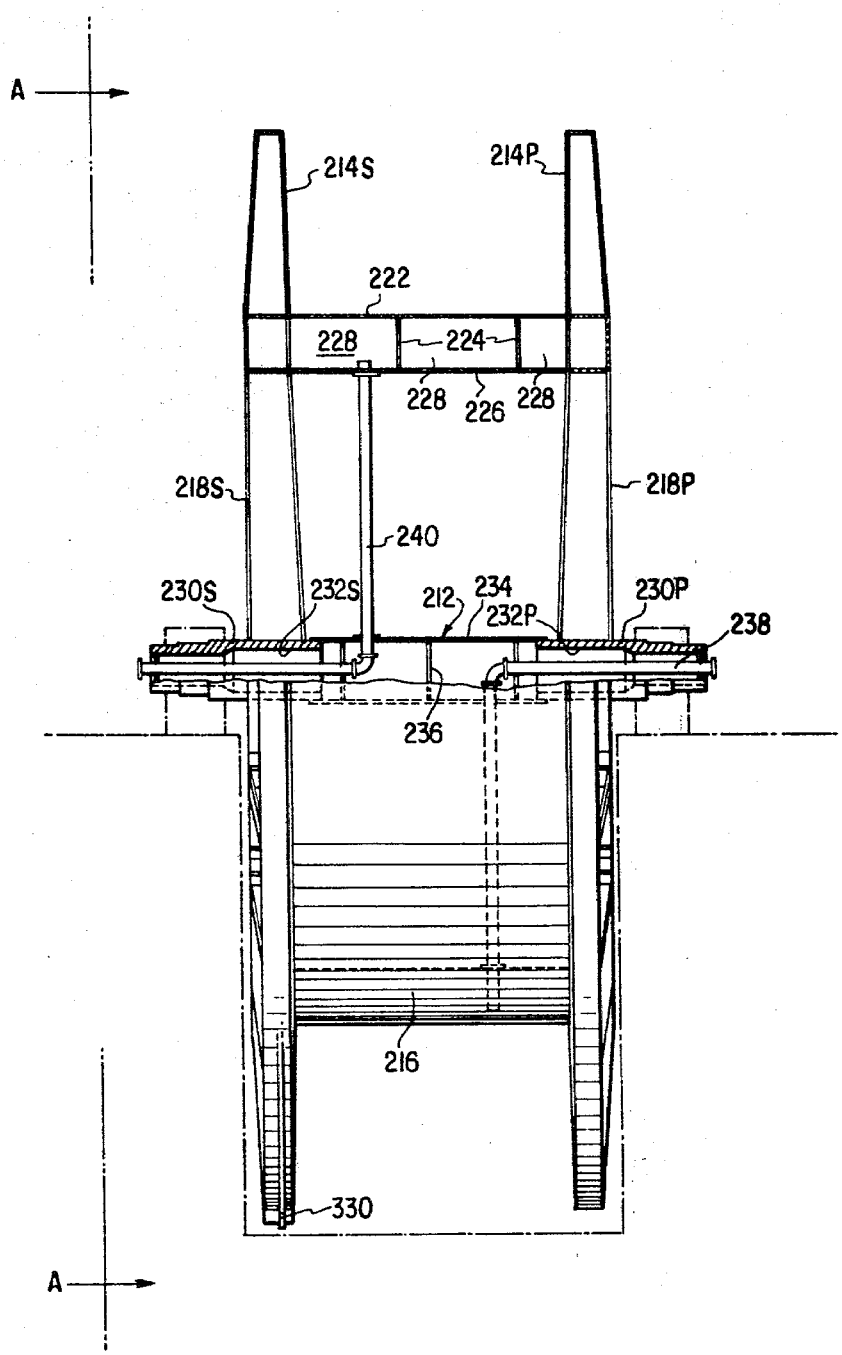
FIG. 7B is a part sectional view of the reel looking aft, through lines B—B of FIG. 7A.

A first embodiment of such a ballast system is shown in FIGS. 7A–7B. In this embodiment, shaft 212 comprises machined end portions 230, each having a central axial bore 232. End portions 230 extend from a tubular central portion 234 which has support plates 236 spaced from each other on the inside of tubular portion 234. Shaft ends 230 and tubular central portion 234 together act as unitary shaft element 212.

A fill and drain conduit 238 extends axially into the reel through one axial shaft bore 232 (e.g., bore 232P); inside the reel, conduit 238 makes a 90° bend and extends radially outwardly toward the interior surface of hub 216. The end portion of conduit 238 may be secured to a transverse member 226. A second or vent conduit 240 extends axially into the reel through the other shaft bore (e.g., bore 232S). Inside the reel, conduit 240 makes a 90° bend and extends radially outwardly toward the inner surface of hub 216; the end portion of conduit 240 may be secured to a transverse bracing member 226. Advantageously and preferably, conduits 238 and 240 extend in opposite radial directions from each other.

In one relatively simple embodiment, the fill and drain conduit 238 may be connected through a swivel connection to a T conduit, connected in turn through valve means to a pump which pumps ballast into the reel and to a drain conduit which pipes ballast overboard. Closing the outlet valve and opening the inlet valve permits sea water ballast to be supplied to the interior of the hub 216; opening the drain valve and closing the inlet valve allows the ballast to drain out of the hub and overboard.

Referring now to FIGS. 8A–8C, vent conduit 240 may be connected through a conduit 242, having an exterior cammed surface 245 to a swivel connection 244. The other side of swivel 244 is connected through conduit means to a vent discharge. The arm of a switch mechanism 248 contacts cammed surface 246 on conduit 242 to control the opening and closing of valves in the vent discharge line. The switch mechanism 248 is adjusted so that the valves are open for only a short period of time, e.g., when the opening of vent conduit 240 is within plus or minus 30° of its apex of rotation. This arrangement prevents a discharge of ballast water when the vent pipe rotates a sufficient distance to be submerged within the hub.

Figure 9A:
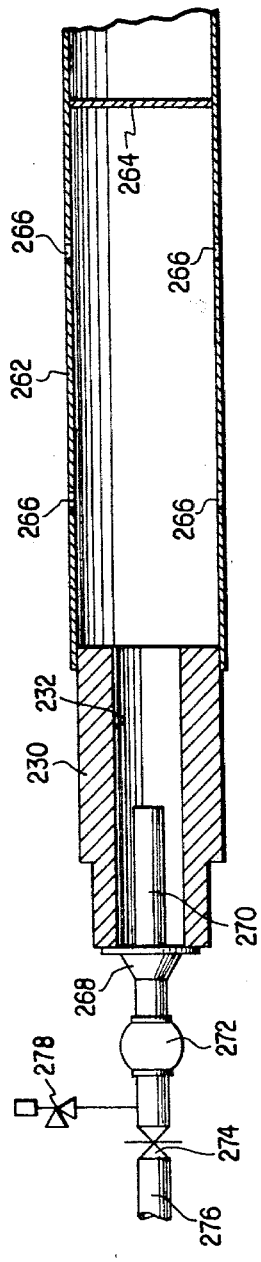
FIG. 9A shows a sectional view of the reel shaft with its associated piping for a second embodiment of the reel ballast system.
Figure 9B:
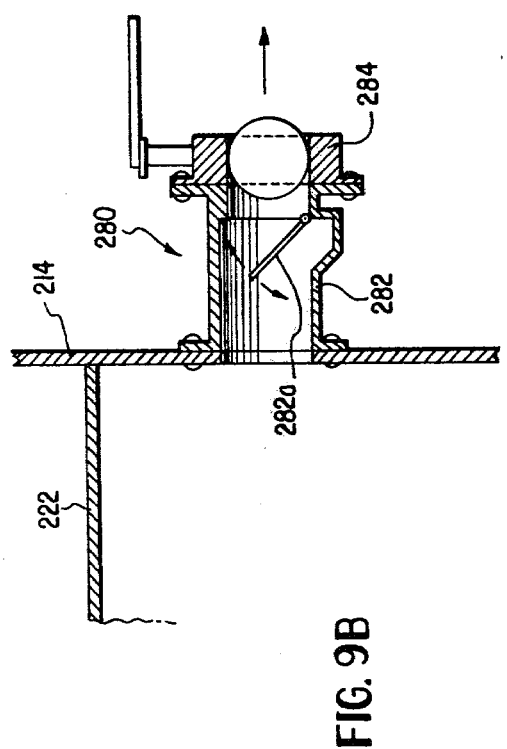
FIG. 9B shows a sectional view of the venting valve arrangement mounted on the reel hub for the second embodiment of the reel ballast system.

In an alternate arrangement, shown in FIGS. 9A–9B, tubular section 262 between shaft end 230 and a sealing plate 264 contains a number of openings 266 which communicate the interior of the tubular shaft portion 262 and the reel hub interior. The outer end of shaft portion 230 may be sealed by a flange 268 through which a pipe 270 extends. The outer end of pipe 270 may be connected through a swivel joint 272 and a gate valve 274 to a fluid supply conduit 276. A spring-loaded pressure relief valve 278 may be provided to avoid excessive fluid pressures from building up.

During the course of a pipelaying operation using this alternate arrangement, as the pipe is unspooled from the reel, water ballast is pumped into the reel hub through the valve 274, swivel joint 272, conduit 270, and openings 266 in shaft portion 262. As water is pumped in, air in the hub is vented to the outside through venting valves, generally designated 280 (FIG. 9B). At least two such venting valves are provided approximately 180° apart on one or both of flanges 214. Vent valves 280 comprise a gravity-operated scupper valve 282 and a lever-operated butterfly valve 284. The disc 282a of the scupper valve is gravity operated. Thus, as the reel rotates and the valve travels downwardly, at a certain point the disc 282a will be pulled closed, aided, if necessary, by the pressure of the ballast water in the hub as the valve moves below the water line; the escape of water ballast from the reel is thereby prevented (other than a possibly minimal amount which may escape before the valve is fully closed). As the reel continues to rotate and vent valve 280 moves up, it will eventually reach a point where the scupper valve 282 is above the water line and gravity pulls disc 282a down. This opens the vent valve 280 to vent air out of the reel hub interior. The butterfly valve 284 is normally kept open and is used essentially as a manual closure.

Figure 10A:
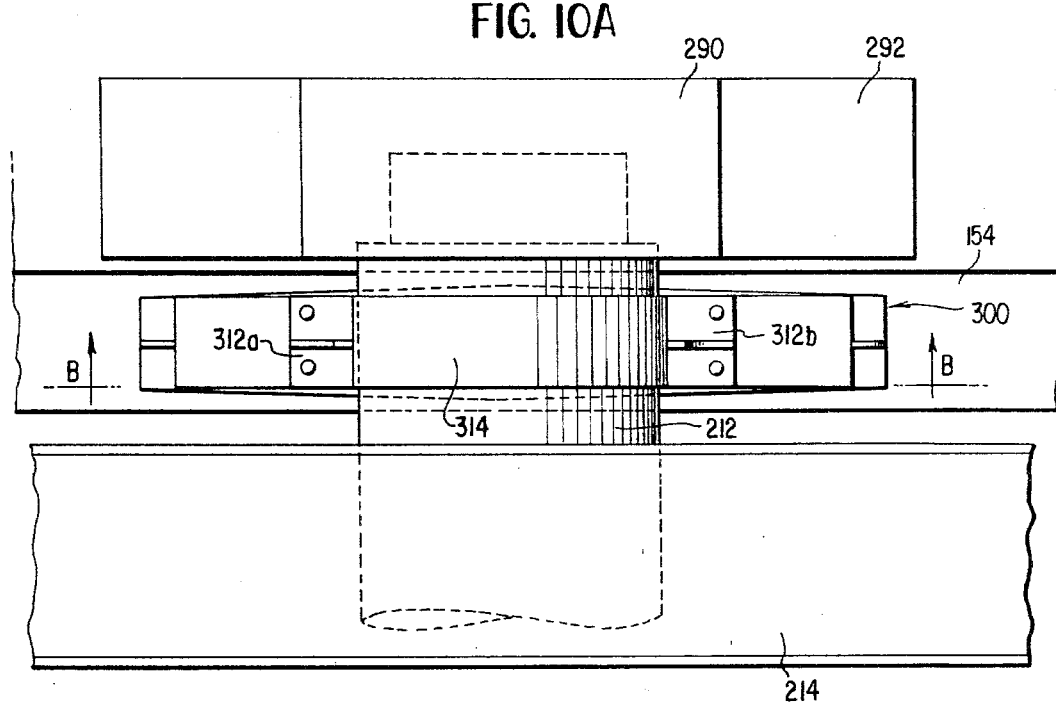
FIG. 10A is a top plan view of the starboard reel bearing assembly and an embodiment of a starboard side reel bearing unloading mechanism.
Figure 10C:
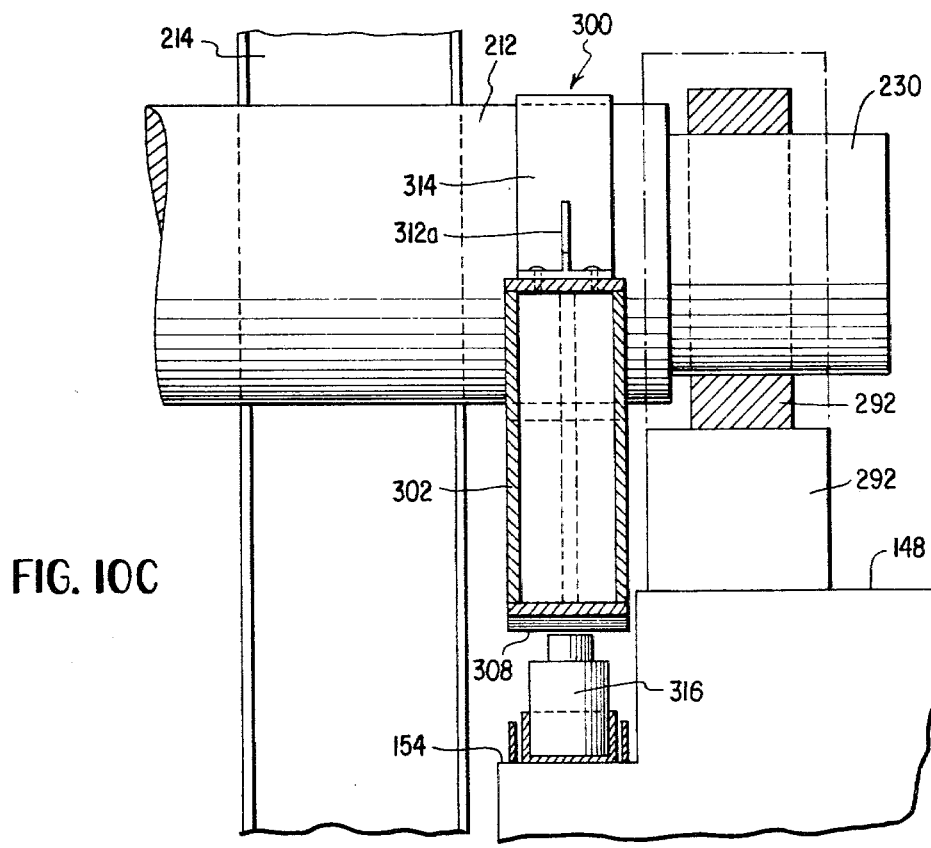
FIG. 10C is a partial section of the starboard side bearing unloading mechanism looking forward, taken along lines C—C in FIG. 10B.

2b. Reel Support System (FIGS. 10A–10C)

The reel shaft 212 seats in a pair of axially opposite bearings 290. The bearings 290 can be commercially available shelf bearings (e.g., FAG Model No. 539948 roller bearing). The bearings 290 rest on bearing support blocks 292. Bearing support blocks 292 in turn are secured to the upper midship horizontal structural members 148 comprising the top of the reel support structure 150. As noted earlier, the bearing blocks rest on bulkheads 134, 136, which distribute the reel and bearing load downwardly and longitudinally outwardly through the reel support structures 150 to the baseline 138.

Preferably and advantageously, the reel may be horizontally located within about ±5% of the longitudinal center of buoyancy. In the preferred embodiment of the vessel as designed for construction, the ship has a length of between about 385'–410'; the reel may be located within a range of about 20' fore and aft of the longitudinal geometric center.

When at sea, the reel ship will sometimes encounter heavy sea conditions which cause the vessel to roll from side to side, thereby placing large loads on the bearings. It may therefore be desirable to unload the bearings when the ship is traveling between pipelaying operations, particularly if smaller bearings than those presently contemplated are used or if the reel size and capacity are increased relative to the bearing size. For this purpose, means may be provided for unloading the bearings, preferably by jacking up the reel shaft to raise it off the bearing seat. An added advantage of this bearing unloading capability is that the bearings can be repaired or removed while the vessel is at sea.

One such unloading mechanism which could, if desired, be incorporated into the reel ship is shown in FIGS. 10A–10C. In this embodiment, a portion 154 of the reel well bulkheads are recessed between frames FR 27 and FR 35. This recess provides space for mounting a reel shaft support mechanism, generally designated 300. The support mechanism 300 includes a support truss 302, having wedge-shaped bottom portions 304, 306, between which is a generally flat bottom section 308. The upper face of the support truss 302 contains an arcuate recess 310. A pair of gussets 312, having arcuately shaped inner faces co-radia with the arc of surface 310, are located on the upper face of support trust 302 to continue the arc of surface of 310. An arcuate plate 314 is secured at its ends to gussets 312 and completes the circle which surrounds shaft 212. One or more hydraulic cylinders 316 mounted on the recessed deck portion 154 engage the bottom surface portion 308 of support truss 302. In the preferred embodiment, up to four hydraulic cylinders, each having a 400-ton lifting capacity, are employed with each of the port and starboard side reel shaft support mechanisms 300. A pair of longitudinally opposed movable end wedges 318a, 318b rest on the recessed deck portion 154 and are slideable under wedge-shaped bottom portions 304, 306 of truss member 302. Wedge members 318 are driven by respective hydraulic jacking screws 320a, 320b. Wedges 318 cooperate with hydraulic cylinders 316 to lift the support truss 302 and shaft 212, and to retain the truss 302 and shaft 212 in their elevated positions. By this arrangement, a strong adjustable structural support is provided for the shaft 212 and reel 210 which allows the bearings 290 to be unloaded for extended periods, such as under heavy sea conditions when the ship is traveling between jobs, or when bearing repair is required.

2c. Reel Drive System

The reel drive system includes a drive gear 330 mounted around the outer rim of one or both flanges 214. In the embodiment shown, the drive gear is located on and circumferentially around the rim of starboard flange 214S. The reel is driven by one or more motors, as shown, for example, in the aforementioned Lang, et al. patent and/or Goren, et al. 1975 OTC paper 332. Such motors are advantageously hydraulic motors (e.g., Hagglund Hydraulic Motor Model #H8385 with Brake Model #FBC-80-2-D or equivalent). The invention is not limited to the use of hydraulic drive motors; D.C. motors are also suitable because of their high torque capability at low speed. The reel drive mechanism also incorporates an automatic tension control feature which maintains a relatively constant tension on the pipe, particularly during lay and/or retrieval operations.

3. Pipe Conditioning Equipment (FIGS. 11–15 and 18–26).

The pipe conditioning equipment, generally designated 40, is mounted sternward of the reel assembly 20. The pipe conditioning equipment 40 includes, inter alia, a main support ramp assembly 410 and a level wind assembly 450. The level wind assembly 450 has various pipe handling equipment mounted thereon, including a pipe bending radius controller 490, pipe straightening equipment 510, including a tensioning assembly, a pipe tie-in clamping assembly 520, a stern pipe guide assembly 540, and various fixed and/or movable work platforms. Also mounted on the level wind assembly are a forward abandonment and recovery (A & R) sheave assembly 560, an aft A & R sheave assembly 570, and pipe support roller assemblies 580, 582.

3a. Support Ramp Assembly (FIGS. 11–12)

Figure 11A:
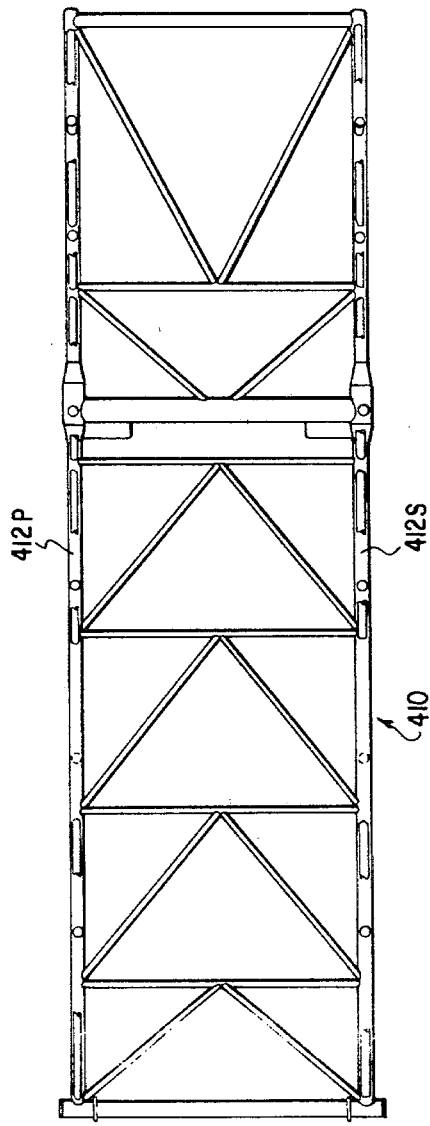
FIGS. 11A-B show plan and side views of the support ramp assembly located near the stern of the vessel in FIGS. 1 and 2.
Figure 11B:
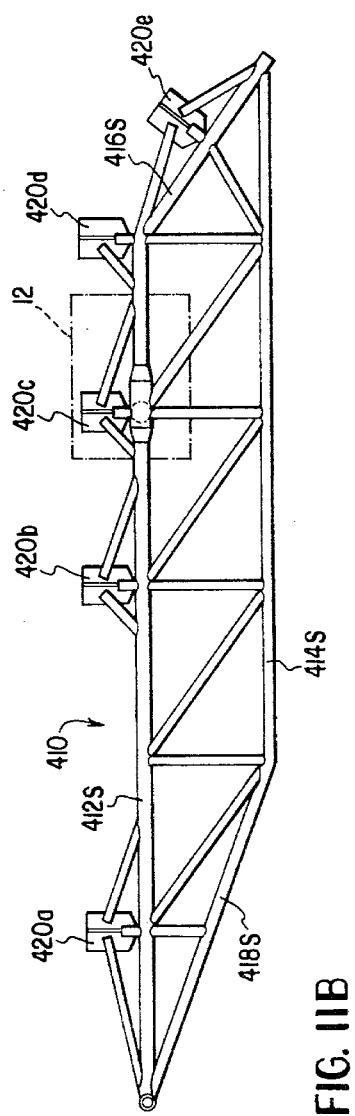

The support ramp assembly 410 preferably comprises an open truss framework of a type shown, for example, in FIGS. 11A–11B. The ramp support assembly 410 comprises upper and lower longitudinal frame members 412 and 414, respectively. These longitudinal frame members are advantageously interconnected by vertical, horizontal and/or diagonal bracing members for additional strength. Upper frame members 412 are longer than lower frame members 414; the upper and lower frame members are longitudinally offset from each other and are connected at their forward end by structural members 416 and at their aft end by structural members 418.

The support ramp assembly 410 mounts a plurality of tracks 420 extending transversely across the support ramp assembly. Tracks 420a–420d are mounted on upper frame members 412 so as to be substantially coplanar with each other. Track 420e is located on connecting member 416 at an angle relative to the plane of tracks 420a–420d.

FIGS. 12A–C show details of a typical ramp mounted level wind track 420. A track base support member 422 extends approximately orthogonally from each of upper frame members 412S and 412P. A track base plate 424 extends between and is secured (e.g., by welding) to each of track base support members 422. A T-shaped track member 426 having flared ends 428 extends upwardly from track base plate 424 and transversely between upper ramp frame members 412. The axially opposite ends of track members 426 are secured (e.g., by welding) to end support plates 430 which, in turn, are secured to the upper frame members 412 and track base support members 422. Additional intermediate track support members 432 may be provided to give the track 426 additional strength.

The support assembly 410 is mounted to the stern portion of the vessel at pivot points 411. Advantageously, a jacking truss 550 may be pivotably connected at one end to the support ramp assembly 410 and at the other end to a jacking mechanism 552 mounted on tracks 554 secured to the vessel deck. The jacking mechanism may be moveable along the tracks to pivot the ramp support assembly 410 about pivot points 411. This allows adjustment of the pipe path through the pipe handling assemblies to thereby adjust the exit or lay angle of the pipe relative to the water.

The angle, (called pipe entry or exit angle) which the support ramp assembly, and its associated pipe handling and conditioning equipment makes with a horizontal plane approximating the water surface plane is adjustable between about 18° and 60°. For a particular pipe laying operation, the angle at which the support ramp assembly is set is determined primarily as a function of (1) water depth along the pipeline right of way (i.e., the path on the sea bottom along which the pipe is to be laid); and (2) characteristics of the pipe to be laid, including pipe diameter, strength and weight.

It is anticipated that during transit of the vessel between jobs or to/from its base (i.e., when not in its pipe laying mode), the angle of the support ramp assembly will be advantageously and preferably set at about 30° with respect to the horizontal. This setting minimizes stresses on the lifting or jacking truss assembly without significantly adversely affecting vessel stability.

Figure 13A:
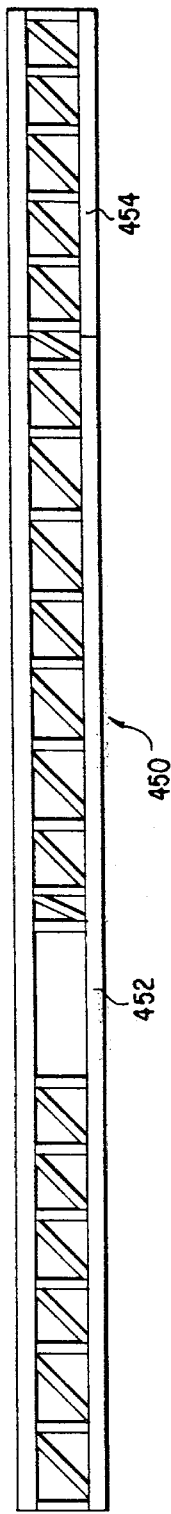
FIGS. 13A and 13B show top plan and starboard side elevations of the level wind truss assembly.
Figure 13B:
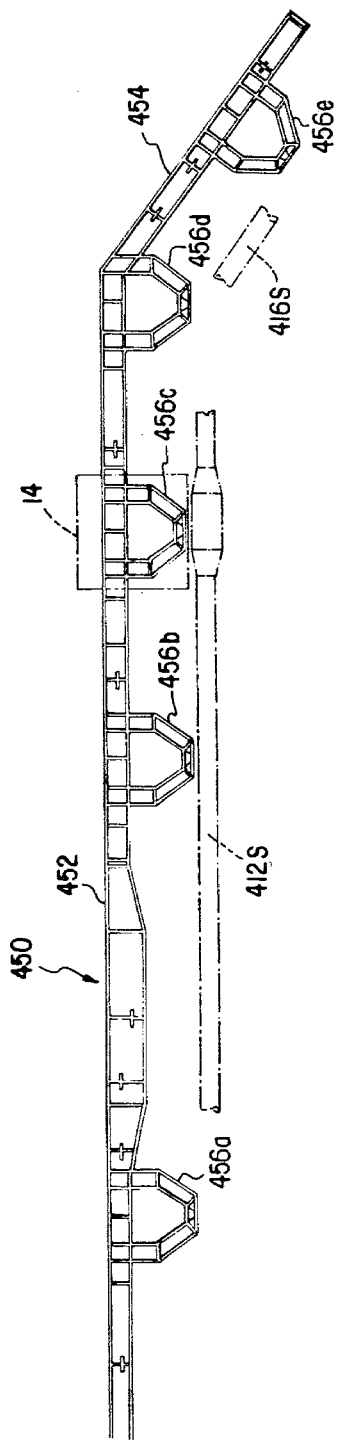
Figure 15A:
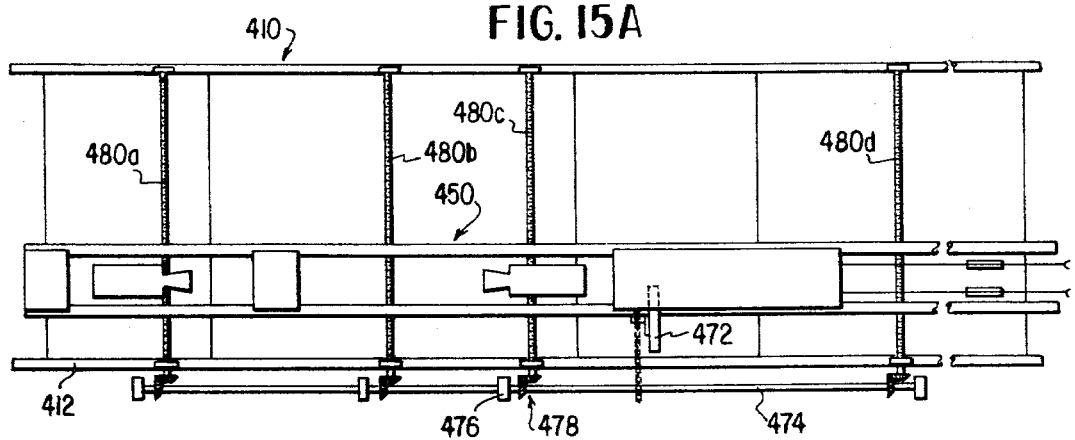
FIGS. 15A-15C show plan, side, and end elevations of the level wind drive assembly.
Figure 15B:
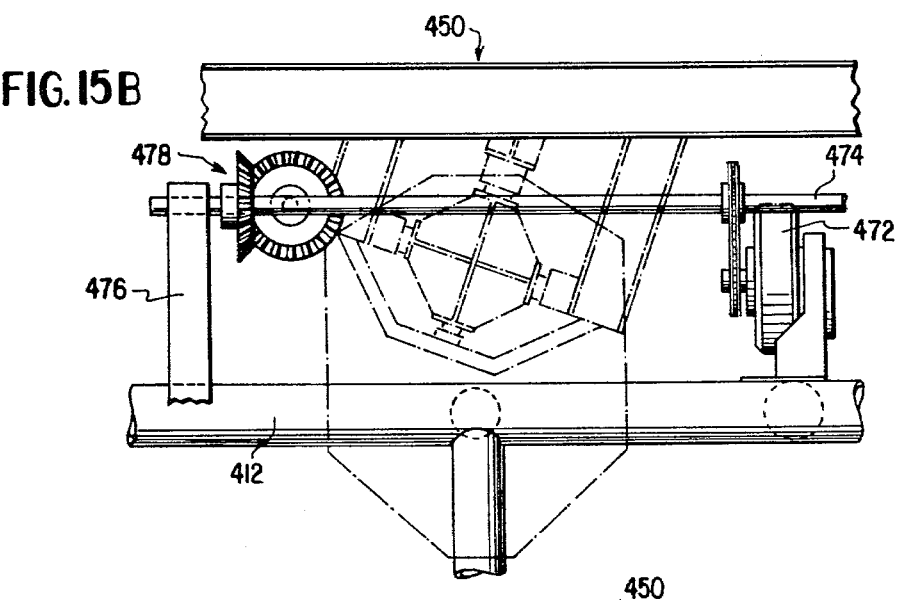
Figure 15C:
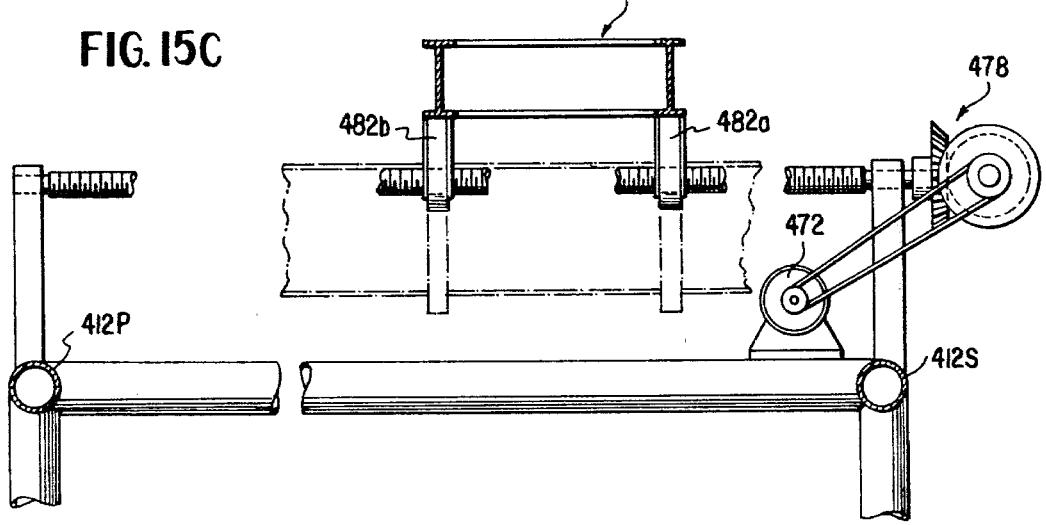

3b. Level Wind Assembly (FIGS. 13, 14)

The level winder 450 consists of a main frame 452. A level wind frame section 454 extends from the forward end of main level wind frame 452 and at an angle thereto which essentially follows the angle of ramp frame connecting member 416.

A plurality of level wind roller carriages 456 extend from the underside of level wind truss 452. The basic construction of each carriage 456 is the same and comprises downwardly extending fore and aft carriage members 458 connected at the top by transverse frames 460 and at the bottom by transverse frame 462. The carriage is located so that a transverse frame member 464, comprising part of the level wind truss, lies intermediate transverse carriage frame members 460a, 460b. Each of carriage members 460 mounts a roller 466 (e.g., Hilman Roller Model No. 5XTDW 200-ton capacity) which rides on a corresponding flared end 428 of T-shaped track member 426. A third or top roller 468 (e.g., Hilman Roller Model No. 6X 300 ton capacity) is mounted to transverse frame member 464 and rides on the flat top surface of T-shaped track member 426. An optional fourth or bottom roller 470 (similar to rollers 466) is provided, especially on carriages 456c and 456d; bottom roller 470 is mounted to bottom frame member 462 and co-operates with the track base plate 424.

It will be seen that the level wind roller carriages 456 essentially surround the level wind tracks 420 while permitting the level wind structure 450 to traverse the width of the support ramp 410.

The level wind drive system may employ, in one contemplate embodiment, a hydraulic motor 472 connected through a chain drive to a drive shaft 474 which is mounted through bearing supports 476 to one of the ramp support frame members 412. Bevel gears 478 connect the drive shaft 474 with a plurality of jack screws 480 which extend transversely across the ramp assembly 410 between frame members 412S and 412P. The externally threaded jack screws 480 are threaded through complementary threaded openings in downwardly extending level wind drive connecting members 482. The hydraulic motor 472 rotates the drive shaft 474 which, through beveled gears 478, rotates jack screws 480. Such rotation of the jack screws 480 produces a traversing motion of the level wind assembly 450 across the width of the ramp support structure 410.

3c. Pipe Bending Radius Controller

At its forward end, the level wind assembly 450 mounts a stress uniformizer or pipe bending radius controller 490. The radius controller assembly may comprise a plurality of rollers 492 mounted to curved frame members 494, which are secured to the level winder frame 452. The radius controller is connected to the level winder through pivot mounting assemblies 496. A jacking mechanism 498 (e.g. a hydraulic screw jack) is advantageously coupled between the level wind forward frame members 454 and the radius controller frame 494. Through operation of the jacking mechanism 498, the radius controller can be pivoted about pivot mounts 496 as needed to adjust for the size of pipe and support ramp angle. In this manner, the amount of curvature to be imparted to the pipe before it enters the straightener 510 can be properly established for varying operating conditions.

The radius of curvature of radius controller assembly 490 is advantageously and preferably approximately the same as the minimum radius of curvature to which the inner wrap of the largest diameter pipe capable of being spooled on the reel 210 and be bent. The radius controller 490 imparts a substantially uniform stress and substantially constant radius of curvature to pipe as it is unspooled and prior to its entry into the straightener apparatus 510. The ratio of the radius of the reel hub $R_H$ to the radius of the radius controller $R_{RC}$ lies in the range of between about 1.2:1.0 and 1:1.2; more particularly, the preferred ratio is about 1.0:1.0.

The radius controller assembly 490 comprises a generally box-like cross section frame 491 to which are secured (e.g., by welding) a plurality of roller support members 492. Pipe support rollers 493 are in turn supported on and between laterally opposite roller support members 492.

The curved side frame members 494 of the radius controller assembly 490 are mounted at one end to the level winder frame through pivot mounting assemblies 496. From pivot points 496, the radius controller assembly 490 advantageously extends straight for a distance at least about to the location of the forward axle of the first straightener track 512. From there, the radius controller extends arcuately to its forward end 497. The length of the radius controller is determined by the above deck clearance available when the ramp assembly is in its lowermost position. The effective radius of curvature of the controller assembly 490 (from the center of curvature to the pipe centerline) varies with the diameter of pipe in use. For pipe ranging between 4½ inch diameter and 16 inch diameter, the ratio of the radius of the reel hub to the effective radius of curvature of the controller assembly 490 varies between about 1:1.236 and 1:1.256.

At an intermediate location between pivot point attachment 496 and the opposite end of the controller frame, the radius controller assembly 490 is supported on the level wind assembly 450 through a jacking mechanism 498 (e.g. using Duff Norton M. 18150-30) jactuators). A pair of laterally opposed pivot mounts 499 is located on the underside of the radius controller assembly frame 491. A corresponding pair of pivot mounts 455 is fixed (e.g. welded) to the forward extending section 454 of level wind frame 452. Hydraulic jacks 498 are mounted to and between respective pivot mounts 499 and 455.

3d. Straightener Assembly

A straightener assembly 510 is mounted to the level wind assembly 450 downstream of the radius controller assembly 490 (in the direction of pipe unspooling). The purpose of the straightener assembly 510 is to impart a reverse bending force to the pipe sufficient to overcome the curvature set by the radius controller 490. For this purpose, three reaction points are required to be exerted on the pipe, the two end points acting in one direction and the intermediate point acting in the opposite direction, such that all 3 forces are substantially coaligned in the plane of pipe bending. A two-roll straightener can be used in which the radius controller is considered as one reaction point. Advantageously and for greater flexibility of operation, a "three-roll" straightener apparatus 510 is used; the straightener rolls may, in fact, comprise tracks of the type described for example in assignee's U.S. Pat. No. 3,680,342, the entire disclosure of which is incorporated here by reference.

Advantageously in the preferred embodiment designed for construction, the straightener assembly 510 comprises a first track assembly 512, a second track assembly 514 and a third track assembly 516. For convenience hereafter the straightener track assemblies 512, 514, 516 will be referred to generically as "straightener rolls", it being implicit therein that the track assemblies can be replaced by individual rollers, if desired.

The first straightener roll 512 is mounted to and between radius controller frame members 494 and is pivotably movable therewith as controlled by jacking assembly 498. Straightener roll 514 is mounted in a straightener frame assembly 518 carried by the level wind 450. Straightener roll 514 is located on the opposite side of the pipe passage from straightener roll 512 and is adjustable in a direction substantially perpendicular to the nominal longitudinal axis of pipe passing through the pipe conditioning apparatus 40. The third straightener roll 516 is also mounted in the straightener frame 518 on the same side of the pipe passage as the first straightener roll 512; straightener roll 516 is substantially fixed in position.

One of the features of the three roll straightener apparatus of this invention is that both of the first and second straightener rolls 512 and 514, respectively, are adjustable relative to each other and to the nominal pipe passage to thereby maintain the actual pipe path as close to the desired nominal as possible for varying pipe sizes and ramp angles.

The straightener assembly also incorporates the tensioner apparatus 520. Specifically, in the presently preferred embodiment, the tensioner may comprise a track or roll 522 mounted in the straightener frame 518 and adjustable in a direction substantially perpendicular to the nominal pipe path in a similar manner as straightener roll 514. Once such suitable tensioner mechanism is used on the aforementioned "Chickasaw" and is described in one or more of the above referenced Sugasti et al, Gibson, Mott et al and Key et al U.S. patents, the entire disclosures of which are incorporated here by reference.

In the commercial embodiment, the first straightener track assembly 512 is adjustably mounted to the radius controller assembly 490. The straightener assembly 512 comprises main carriage members 5121a, 5121b, between which are mounted rollers for supporting the track mechanism 5122. The carriage members 5121 are pivotably mounted to a frame 5123 at pivot points 5124a, 5124b. The frame 5123 is in turn mounted for movement in the direction of arrow $S_1$ (substantially perpendicular to the longitudinal plane of the radius controller assembly 490). Guide rollers 5126 fixed to the frame 5123 ride on "T" or "I" members fixed to the side frames of the radius controller assembly and permit movement of the first straightener track 512 in the direction of arrow $S_1$, while substantially preventing transverse movement thereof. Movement in the direction of arrow $S_1$ is controlled in the commercial embodiment by a pair of transversely opposed hydraulic pistons, the cylinders of which are secured to the radius controller frame 492 and the pistons of which are coupled to the respective pivot mountings 5124.

Straightener track assemblies 514 and 516, along with power driven tensioner track assembly 522, are pivotably mounted to the straightener frame 518 at pivot mounting points 5142, 5162 and 5222, respectively. Track assemblies 514 and 522 are also adjustable toward and away from the pipe path in the direction of arrow $S_2$ by means of hydraulic pistons 5144a, 5144b and 5224a, 5224b, respectively.

Two sets of tensioner pipe clamp assemblies 5102 and 5104 are mounted to the straightener frame 518 forward and aft of the straightener/tensioner tracks 516, 522. The tensioner pipe clamps may be used to advantage when it is necessary to keep the pipe longitudinally aligned and to prevent transverse pipe movement, such as during pipe tie-in or lay termination operations. One such tensioner pipe clamp is shown in FIG. 20D. Each clamp comprises a member 5106 secured to the straightener frame 518 (e.g., by welding, bolting, etc.). Member 5106 may preferably and advantageously have a square tubular cross section with a plurality of pairs of spaced openings 5108 on opposite sides. A plate-like member 5110, having a central opening therein which is of similar shape to and slightly larger than the dimensions of the member 5106, is slidably mountable over member 5106. Plate 5110 has opposed pairs of through holes 5112 which can be aligned with through holes 5108 in member 5106. A pad mounting member 5114 slidably mounts on member 5106 to butt up against member 5110. Pad mounting member 5114 mounts a pipe clamping pad 5116, advantageously having a V-shaped cross section.

Plate 5110 is aligned with a given set of openings 5108 depending on the diameter of the pipe to be clamped. Plate 5110 has threaded openings therein, through which pass fine-adjusting screws to butt up against the back plate of member 5114. After plate 5110 is secured in alignment with the appropriate set of openings 5108, the fine-adjusting screws are used to adjust the position of member 5114 and pad 5116 against the pipe.

Opposed pairs of clamps 5102, 5104 are movable toward and away from each other to clamp and unclamp the pipe as desired, primarily against lateral movement thereof.

The first and second straightener track assemblies 512 and 514 are independently adjustable relative to each other. The first straightener track assembly 512 is pivotably adjustable with radius controller 490 and is separately adjustable toward and away from the pipe path (in the direction of arrow $S_1$). In this manner, the straightener track assemblies can be properly aligned relative to each other to impart the proper reverse bending forces to the pipe and to align the pipe path to ensure a proper exit angle from the straightener.

It is desirable during the pipe laying process that the pipe make good contact with the first straightener track and with the radius controller rollers 493. The pipe should contact the maximum number of rollers 493; in this way, the bending force application points are distributed along the pipe and the bending forces are thus not concentrated at a single point. Such distribution of the bending forces over a length of pipe materially reduces the likelihood of damage to the pipe and/or coating as the pipe is bent around the radius controller.

One on-site operational sequence to establish the desired pipe path can be as follows:

1. The support ramp assembly 410 is raised by pivoting it around pivot points 411 to establish the desired exit angle of the pipe from the ship (corresponding to entry angle of the pipe into the water).

2. The second straightener track assembly 514, which had been raised to its maximum height above the pipe path during the spooling-on operation, is lowered into a predetermined position above the point of no-load contact with the pipe. This position is a function of a number of variables, including lay depth, lay angle and tension, pipewall thickness, yield strength of pipe, diameter of pipe, etc.

3. The first straightener assembly 512 is then raised an amount also determined as a function of the above variables.

4. The radius controller assembly 490 (and first straightener assembly 412) is rotated about is pivot axis 496 an amount which is also determined as a function of the above-noted variables.

5. If necessary, the first straightener assembly 512 is further moved relative to the radius controller assembly to make good distributive contact with the pipe.

At the conclusion of this operation, and upon commencement of the laying operation, the pipe exiting the straightener assembly 510 optimally will have zero or near zero net bending stresses and zero or near zero net residual bending strains. Thus, the pipe will optimally exit the straightener assembly 510 parallel to the longitudinal plane of the level winder assembly and ramp structure.

3e. Additional Equipment

Additional pipe handling equipment, including a pipe tie-in clamping assembly 520, a main pipe clamping assembly 530 and a stern pipe guide assembly 540 are also located on the level winder assembly 450.

The pipe coming off the reel 210 should make sufficient contact with the radius controller 490 at a tangent thereto to bend the pipe sufficiently so that each wrap of pipe being unspooled will have the same amount of curvature as it enters the straightener.

One way which has been suggested to accomplish this uniformity would be to pass the pipe through a preferably vertically adjustable set of rollers 562 located on a tower 560 aft of the reel 210. The rollers 562 force each wrap of pipe to have a sufficiently large radius of curvature to be tangent to the radius controlelr 490 as the pipe is unspooled. Absent rollers 562 or some similar mechanism for imparting the desired bending moment to the pipe, each wrap of pipe unspooled would have a different set; that is, the inner wraps have a smaller radius of curvature than the outer wraps so that the curve on the free pipe between the reel and the pipe conditioning equipment would change as a function of the wrap being unspooled; this, in turn, would cause the pipe to contact the radius controller at a different location for each wrap, thereby altering the effect of the radius controller and its ability to impart a uniform radius of curvature to the pipe before it passes through the straightener assembly 510.

As an alternative to the tower shown, it is considered that a "free floating" roller assembly may be used. Such roller assembly would ride on the upper surface of the pipe and be tied to the deck of the ship by cable, thus, the pipe and cables together act as the roller support, with the pipe exerting an upward force and the cable a downward force on the rollers.

The roller assembly 562 whether tower-mounted or cable tethered, increases the ability of the reel to impart larger hold-back tensions on the pipe than would be possible without such roller assembly 562. This factor increases the capability of the ship of this invention to lay larger pipe in deeper water than might otherwise be the case.

(1) Pipe Clamping Assemblies

A pipe tie-in clamping assembly 520 is mounted to the level wind assembly aft of the straightener assembly 510 and between a pair of pipe support roller assemblies 580 and 582. The clamping assembly 520 comprises a lower semi-circular clamp half 5202 and an upper semi-circular clamp half 5204 hinged together at 5206. When a pipe P (shown in phantom in FIG. 21) is resting in lower clamp half 5202, the upper clamp half 5204 swings over the pipe to align through-openings 5208 and 5210 of the upper and lower clamp halves, respectively. A locking pin (not shown) may then be inserted through the aligned openings to lock the clamp halves together.

A pair of hydraulic cylinders 5212a, 5212b are pivotably connected at one end to the lower clamp half 5202; the other ends of the hydraulic cylinders are pivotably mounted to the level wind assembly 450 directly or through other rigid mounting means, as desired. Advantageously, the center line of each hydraulic cylinder 5212 lies at an angle of approximately 45 degrees on either side of the vertical center line of the clamp. This mounting arrangement of the clamping assembly 520 permits the clamp halves 5202 and 5204 to be moved freely in a plane substantially perpendicular to the pipe path. Movement of the clamping halves is limited by the piston stroke of the hydraulic cylinders 5212. During normal pipe spooling and laying operations, the tie-in clamp assembly will be in its retracted (lowermost) position out of the pipe path.

The inner faces 5214a, 5214b of the clamp halves advantageously comprise curved plates which may be on the order of one foot in length (measured along the pipe path. The internal diameter of the tie-in clamp assembly can be varied by inserting adapter blocks 5216 (FIG. 22A). These blocks, which may be advantageously made of wood, such as oak and have the shape of a half donut, are dimensioned as required to clamp pipe having diameters smaller than the internal diameter of the clamp assembly. The adapter blocks 5216 may be removably secured to the clamp faces 5214 by a clamp arrangement comprising end plates 5218 held by through bolts 5219 (see FIG. 22B).

When joining two pipes, the cut ends may be butted up to each other within the confines of the clamp faces 5214; the clamp is moved by the hydraulic cylinders 5212 up and down and/or transversely to align the pipe ends with each other. The aligned pipe ends may then be tack welded through the clamp; the clamp is then removed and full welding of the joint completed.

The main pipe clamp assembly 530 is preferably and advantageously located between the aft pipe support roller assembly 582 and the stern pipe guide assembly 540. The clamp halves 532, 533 are mounted to the level wind assembly 450 through adjusting means, such as hydraulic cylinders 534a–d. Cylinders 534 are each pivotably mounted at one end to level wind assembly 450 and at the other end to lower clamp half 533 and are each independently adjustable. The pipe clamp members 532, 533 are advantageously and preferably movable in a first plane substantially perpendicular to the pipe path and in a second plane substantially along and containing the centerline of the nominal pipe path. The clamp is retracted to its lowermost position (relative to the level wind structure) during pipe spooling/laying operations. The internal diameter of the clamp is adjustable to accommodate and clamp pipe between four inch and sixteen inch diameter at a pipe-holding tension of at least up to about 280,000 pounds.

(2) A & R Sheave Assemblies

Figure 23A:
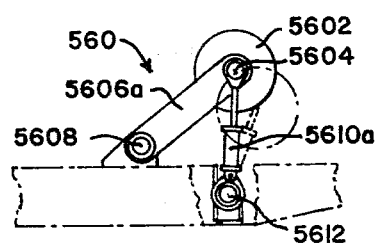
FIGS. 23A-B are starboard side and transverse views, respectively, of the forward A & R sheave assembly.
Figure 23B:
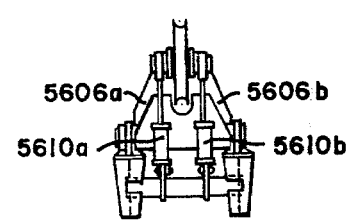
Figure 24A:
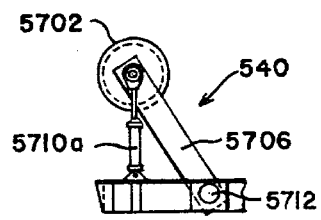
FIGS. 24A-B are starboard side and transverse views, respectively, of the aft A&R sheave assembly.
Figure 24B:
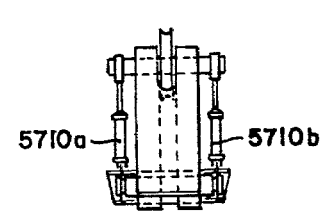

The forward A & R sheave assembly 560 is mounted to the level wind assembly 450 between the pipe tie-in clamp assembly 520 and the forward pipe support roller 580. FIG. 23A shows the sheave assembly in its raised or "in-haul" position in solid line; the lowered or stowed position is shown in phantom.

The sheave 5602 rotates about the axis of its shaft 5604. The shaft is rotatably mounted to a pair of support arms 5606a, 5606b. The opposite ends of support arms 5606 rotate about a pivot mounting assembly 5608. Hydraulic cylinders 5610a, 5610b are rotatably secured to a pivot mounting assembly 5612 on the level wind assembly 450; the other end of each hydraulic cylinder is rotatably secured to shaft 5604.

The aft A & R sheave assembly comprises a sheave 5702 mounted for rotation about the axis of its shaft 5704. The shaft 5704 is rotatably mounted to a pair of support arms 5706a, 5706b. The opposite ends of support arms 5706 are rotatably mounted to a pivot mounting assembly 5708. Hydraulic cylinders 5710a, 5710b are rotatably secured to pivot mounting assemblies 5712a, 5712b, respectively, located on the level wind assembly 450.

The above-described arrangement of the forward A & R sheave assembly 560 permits the raising and lowering of the sheave assembly during pipe abandonment/recovery operations and pipe spooling/laying operations, respectively. The aft A & R sheave assembly 570 is similarly mounted to the level wind assembly 450 for rotational movement opposite that of the forward A & R sheave assembly.

Figure 19:
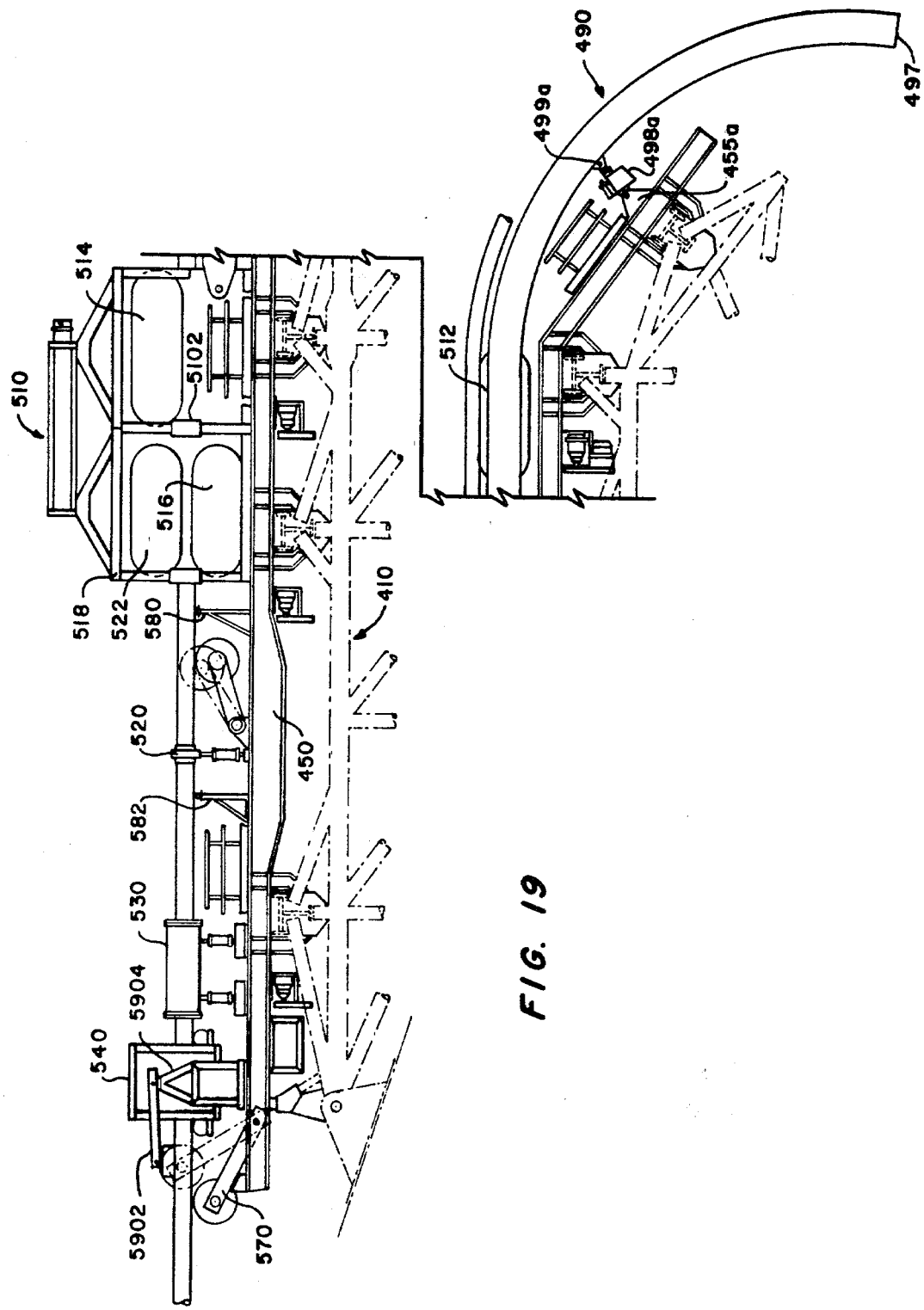
FIG. 19 is a starboard elevation of the level wind assembly and associated pipe handling equipment.
Figure 26C:
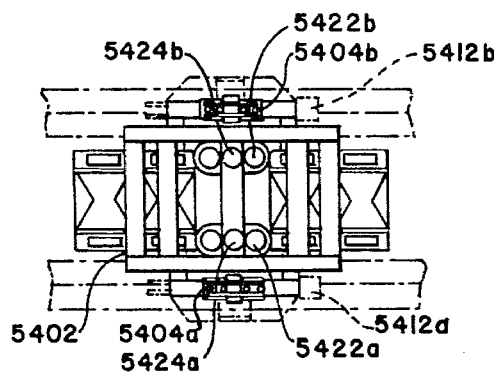
FIGS. 26A-C are starboard side, top plan, and transverse views, respectively, of the stern pipe guide assembly.
Figure 26A:
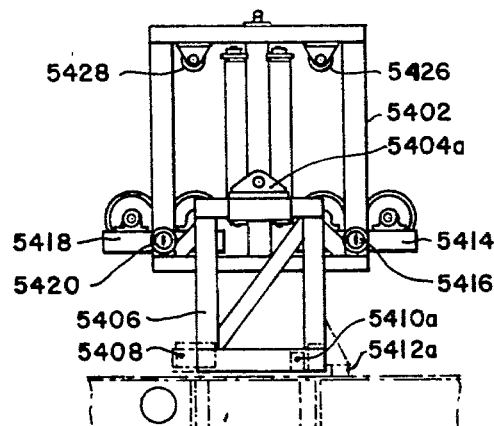
Figure 26B:
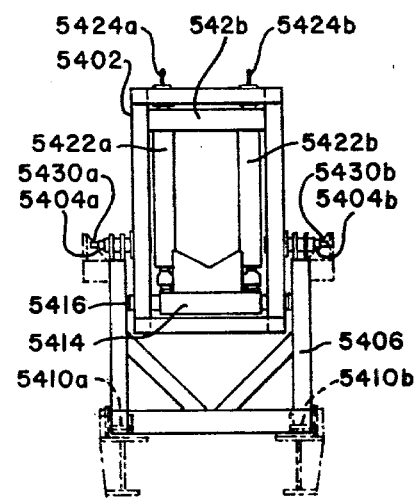

During pipeline abandonment and recovery operations, the A & R cable connected to the pipe end is maintained under sufficient tension to hold the desired catenary in the pipeline. The cable is supported above and along the ramp and level wind assembly by the forward and aft A & R sheaves. Referring to FIG. 19, the forward A & R sheave assembly 560 projects forwardly; the aft A & R sheave assembly 570 projects sternward. This arrangement maximizes the load distribution imparted to the sheave assemblies by the A & R cable through the main support arms 5606 and 5706 and minimizes the load on the hydraulic cylinders 5610 and 5710.

The pipe clamping and A & R sheave assemblies are employed during a tie-in operation, for example, when a job requires more pipe than can be carried in one spooled load. In such a case, when one load of pipe has been laid, the end of the pipe is capped and released to settle on the bottom, attached to a cable and marker buoy. The ship then returns to base to pick up a second load of pipe.

When the reel ship returns to the marked location with another load of spooled pipe to continue the job, an A & R cable from a winch located on the ship's main deck is passed over the forward A & R sheave 5602, along the pipe path aft through the stern pipe guide assembly 540, and over the aft A & R sheave 5702. At this stage of the pipe end recovery operation, the sheaves 5602 and 5702 are in their raised or haul-in position (as shown in solid line in FIGS. 23A and 24A). The end of the A & R cable is attached to the marker buoy cable and the pipe end is winched up from the sea bottom.

As the end of the pipe reaches the aft A & R sheave assembly 570, the tension on the A & R cable is increased, if necessary, to match the cable angle with the ramp angle so that the aft sheave assembly 570 is no longer required to support the cable. The hydraulic cylinders 5710 are actuated to retract the sheave 5702 by pivoting the assembly around pivot point 5712. This removes the aft sheave 5702 from the pipe path and possible contact with and damage to the pipe and/or its coating.

Haul-in operation is continued until the capped pipe end clears the tie-in pipe clamp assembly 520. While holding the pipe end with the A & R cable, the main pipe clamp 530 is raised into position and closed to clamp the pipe against longitudinal movement. The pipe tie-in clamp 520 is next raised into position and clamped around the pipe. With the pipe thus adequately held against movement, the A & R cable can be released, the cable disconnected from the pipe end, and the bull plug capping the pipe end removed (e.g., by flame cutting). Hydraulic cylinders 5610 are actuated after the A & R cable is removed from the capped pipe end to pivot support arms 5606 about pivot point 5608 to thereby retract sheave 5602 out of the way of the pipe path (as shown in phantom in FIG. 23A). The end of the spooled pipe is brought down the pipe path by the tensioner tracks 516, 522 into position abutting the cut end of the recovered pipe. The tie-in clamp is adjusted on its hydraulic cylinders as necessary to bring the two pipe ends into alignment.

During the tie-in operation, after the recovered pipe end has been clamped in the tie-in clamp and the capped end cut off, the end of the spooled pipe is butted up against the end of the recovered pipe and the tensioner clamps 5102, 5104 are secured against the pipe to clamp it primarily against lateral movement. The pipe ends are then welded together and the several clamps removed. The ship is now ready to continue the laying operation.

(3) Stern Pipe Guide Assembly

The stern pipe guide assembly 540 includes a generally open box like main roller carriage assembly 5402. Pivot mountings 5404a, 5404b mount the main roller carriage 5402 to a roller carriage support base frame 5406. A pivot mounting 5408 couples the aft portion of the support base 5406 to the level wind assembly 450. The forward portion of base 5406 is loosely secured to the level wind assembly by retaining pins 5410 which permit a small amount of pivotal motion of the support base about pivot axis 5408. Load cells 5412a, 5412b are mounted to the level wind frame 452 and measure the vertical forces on the stern pipe guide assembly 540 about pivot axis 5408.

A first pair of stern guide rollers 5414 are pivotably mounted to the forward portion of carriage 5402 for rotational movement about a pivot axis 5416. A second set of stern pipe guide rollers 5418 are pivotably mounted to the rear portion of the carriage 5402 for rotational movement about pivot axis 5420. The first and second sets of stern pipe guide rollers 5414, 5418 support the pipe as it exits the vessel; the rollers and carriage are pivotable about three independent pivot axes 5404, 5416 and 5418.

Two pairs of vertical axis side guide rollers 5422a, 5422b are mounted to the carriage 5402 for movement about respective vertical pivot axes 5424a, 5424b. A pair of upper horizontal axis guide rollers 5426, 5428 are mounted to the carriage 5402 above the pipe path. These latter rollers are provided to prevent damage to the pipe in the event that excessive tension and/or heave conditions cause the pipe to rise significantly above the pipe path. Normally, rollers 5426, 5428 would not be contacted by the pipe.

In addition to supporting the pipe at the stern of the vessel, as the pipe exits the ramp and enters the water, the stern pipe guide assembly 540 measures the buckling load on the pipe. Specifically, the load cells 5412 measure vertical forces exerted by the pipe on the stern guide assembly 540 due to pitch and heave of the vessel. If such loads exceed the bending limit of the pipe, undesirable damage may be done to the pipe and/or its coating. Lateral forces on the pipe are measured by load cells 5430a, 5430b located at pivot mountings 5404a, 5404b.

The load cell force measurements may be read out in the vessel's control room to enable the controller to maintain continuous watch over and control of conditions affecting the pipe as it exits the ship. For example, readings from load cells 5430 enable the controller (e.g. ship's captain) to determine whether the pipe is being overloaded due to excessive yawing of the ship; course corrections can then be made as needed to reduce such pipe loading.

An angle measuring device 590 measures the exit angle of the pipe relative to the ramp assembly 410. The angle measuring device 590 comprises a follower arm 5902 pivotably mounted to a base structure 5904 which in turn is secured to the stern pipe guide base structure 5406. The follower arm rides on the pipe and measures the angle of the pipe relative to the parallel planes of the level wind assembly 450 and ramp assembly 410. In one preferred embodiment, this angle measurement information can be supplied to a pre-programed computer control system to control the reel braking system and/or the ship's thrust system to thereby control the pipe tension and ship's speed.

4. Portable Reels

The reel ship of this invention is capable of carrying spooled pipe on "portable" reels, that is, reels which do not form part of the basic ship construction, but which are mounted on, e.g., skids, and may be offloaded at the shore base. This advantageous feature permits the shore base to prespool pipe on such portable reels and store the spooled reels in the yard while the reel ship is at sea. When the ship returns to port, any empty portable reels on board can be removed and the prespooled waiting reels be loaded on board, thereby reducing down time in port.

Advantageously, one or more such portable reels, generally capable of carrying up to 6" diameter pipe, may be mounted on the clear deck space forward of the main reel 210. This secondary pipe may be passed over the main reel to the pipe handling apparatus 40. The secondary pipe may bypass the straightener assembly 510 and be bundled with the main pipe upstream of the stern guide assembly 540 so that it enters the water at the same lay angle as the main pipe.

5. General Characteristics

In a preferred embodiment of this invention, the reel 210 has a diameter of about 82 feet. Pipe capacity is about 2,000 tons. Capacities in terms of pipe size and length are shown below:

| Nominal Pipe Size (Inches) | Approximate Capacity | |
|---|---|---|
| | (Feet) | (Miles) |
| 4 | 267,000 | 50.5 |
| 6 | 160,000 | 30.2 |
| 8 | 104,000 | 19.7 |
| 10 | 73,000 | 13.8 |
| 12 | 54,000 | 10.3 |
| 14 | 45,000 | 8.5 |
| 16 | 30,000 | 5.7 |

Capacities shown are for typical projects in medium to deep water. The vessel is also capable of carrying two portable reels with total capacity of 500 tons. The portable reels are positioned so their pipes may be payed out as a bundle with the primary pipe.

Other characteristics of the preferred embodiment of the reel ship of this invention are (approximately):

| | |
|---|---|
| Length overall | 405 feet |
| Beam | 70 feet |
| Depth | 28 feet, 6 inches |
| Draft, operating | 18 feet |

6. Applications

Below are discussed a number of uses for the reel ship in the offshore construction industry.

6a. Subsea Completions

Of the many potential uses employed by the reel ship, one of the most important applications is in subsea completions and subsea tie-ins. Major advantages include:
1. Pipe is welded and tested on shore before laying offshore. This is especially an advantage for through flow lines, which can be drifted before laying.
2. Speed of laying pipes offshore substantially reduces delays due to weather and minimizes interference with field operations.
3. Since the vessel can dynamically position itself next to platforms, wellheads, etc., the danger to underwater pipelines or other bottom equipment is minimized. The reel ship is also much faster in setting up, moving away from, and moving between locations.
4. Except on the largest of projects, one load of pipe is all that is required to complete pipelines to subsea wellheads.
5. The reel ship can lay bundled configurations made up of pipes or combinations of pipe and cable as desired.

6b. Bundled Pipelines

In the "stovepiping" method of laying pipeline offshore, a new section of pipe must be welded (added) every 40 or 80 feet. This method requires one "welding line" for one pipeline. If it is desired to lay pipe in bundles, then, in effect, a "welding line" must be set up for each pipe in the bundle. Since most standard pipelay barges are designed for just one pipeline, finding enough room for one or more additional pipe "welding lines" is difficult.

Furthermore, most pipeline vessels apply tension to the pipe with the use of a tensioner, specifically designed to handle one pipe, and not two or more.

These problems are overcome by the reel ship of this invention with the use of the main reel and one or more portable reels. A typical bundle, for example, could consist of an eight inch pipe coming off the main reel and four inch and two inch pipe coming off separate portable reels. It is also possible to have more than one pipe bundled together on a reel.

Pipes for different lay operations can be carried together on the reels. The experience of the assignee and/or its predecessors-in-interest in laying pipe by the reel method has shown that different size pipes can be spooled over other pipes without damage.

Because of the large spooling capacity of the reel ship of this invention on the main and portable reels, pipe can be carried on one trip for a number of separate lay operations, such as those required on a subsea completion project.

6c. Operation in Congested Areas

In an area which is congested with many platforms, pipelines, subsea completions, construction barges, supply boats, etc., the vessel which can operate without the use of a conventional anchoring system will have a great advantage.

One example of this application would be in a developed field which already has many operating pipelines. If the need arose to bring an adjacent field's production into this facility by pipeline, it could be effectively accomplished with the dynamically positioned reel ship. With the pipe already loaded onto the reel, the ship would dynamically position itself next to the platform in the developed field, feed out the end of the pipe to the platform and lay away from the structure, thus requiring only a minimum time in the congested area.

Another application of the dynamic positioning capabilities of the reel ship would be pipeline tie-ins at platforms, subsea completions or manifold centers. Besides the reduced risk by not using anchors, the speed at which the ship can set up on location, move between locations, and move off location at the end of the job, will allow the maximum time to be devoted to completing the project during favorable weather periods.

6d. Laying Pipe in Shipping Lanes

Modern pipeline barges can lay more than two miles of pipe in a 24-hour period by the "stovepiping" method; present-day reel barges can lay the same amount of pipe in a fraction of that time. In each case, the barge anchor patterns in doing this may cover an area approximately three miles long and one mile wide. If this area is located in a major shipping lane, such as the English Channel, unnecessary delays to shipping could be expected.

In contrast, the reel ship could lay the two miles in a few hours, and, since no anchoring pattern is used, the vessel would occupy only a nominal width of the shipping lane during any particular period of time. The reel ship's unique pipelaying operation offers a means of reducing inconvenience to shipping when pipelines must be installed in areas with heavy commercial shipping traffic.

6e. Remote Locations—Worldwide Operations

Certain areas of the world, such as the Beaufort Sea, allow very little time each year for offshore construction. Similarly, land support bases and the logistics associated with the base operations, offer doffshore operations.

The reel operation of the reel ship offers advantages, of which a few are listed below:

The speed at which the reel ship can travel to such locations.

The large pipe capacity the reel ship can carry in one trip.

The speed in laying offshore.

Minimum shore support if complete requirement of pipe can be carried in one load.

The reel ship will be able to mobilize from the Gulf of Mexico to offshore areas such as the North Sea, California, Brazil, and the Mediterranean in approximately 2½ weeks; the North Sea to the Mediterranean will take only one week.

Since the reel ship has a large carrying capacity for smaller pipes, it will be able to operate from a base, for example, in the North Sea, and mobilize to an area like the Mediterranean. This eliminates the need to set up bases in every area where pipe is laid.

In short, the reel ship is able to mobilize, complete the job, and demobilize in a short period of time.

7. Operating Example

The following example is presented to illustrate the basic reel method laying procedure.

A. Pipe size—10-inch nominal

B. Pipeline length—25 miles

The basic operation begins with coated pipe delivered to the spooling yard. The pipe is welded into approximately 1,700 foot lengths. All welds are X-rayed and coated before spooling onto the reel ship.

At the time the reel ship arrives, approximately 12.5 miles of pipe is ready for spooling. Thirty-nine 1,700 foot lengths of pipe are spooled aboard, stopping only to weld, X-ray and coat joints at the end of each new length.

The reel ship, now loaded with pipe and necessary anodes, mobilizes to location.

Once at location, the ship is dynamically positioned next to the first platform and a cable tied to the platform is attached to the pipe.

The lay operation now commences.

Anodes are added at the sterm of the ship during laying. The ship is normally stopped for 3–5 minutes to add each anode as required.

At the end of the 12.5 mile lay, the pipe is secured in a clamp at the stern of the ship.

An abandonment head is welded on and the pipe lowered to the seabed with a winch. The lowering/pick up cable is attached to a buoy.

The ship then returns to the yard to spool up the second load of pipe.

Upon returning to the laydown point, the pipe is picked up and again clamped. The new pipe is weldedon, the joint is X-rayed and coated, and the lay operation commences again. At the second platform the pipe is pulled in and secured at the platform. The pipeline is then tested and the reel ship is demobilized.

Additional features of the reel ship and its operation are described in a paper co-authored by Kenneth R. Friman, Stanley T. Uyeda and Herman Bidstrup, entitled "First Reel Pipelay Ship Under Construction—Applications Up to 16-inch Diameter Pipe 3000 Feet of Water" (OTC Paper No. 3069) to be presented at the Offshore Technology Conference in Houston, Tex., May 8-11, 1978 and contained in the proceedings thereof. Said Friman et al paper is incorporated herein in its entirety by reference thereto.

8. Summary

It will be seen from the foregoing description that the reel ship of this invention represents a new and different advance in the art of offshore reel type pipelaying techniques. In particular, the ship represents a new type of vessel construction which is advantageously suited for carrying large pipe spooling reels to conduct subsea pipelaying operations quickly and economically for a world market.

It will further be seen that certain features of the invention disclosed herein are applicable to reel pipe laying vessels other than self-propelled ships. It will be apparent, for example, to a skilled naval architect that the reel and its support structure, the pipe handling and conditioning equipment and at least part of the dynamic positioning apparatus could be incorporated on and/or in a towel (non-self propelled) vessel.

The invention may be embodied in other specific forms without departing from the spirit or essential characteristics thereof. The embodiment described above is therefore to be considered in all respects as illustrative and not restrictive, the scope of the invention being indicated by the hereafter appended claims rather than by the foregoing description, and all changes which come within the meaning and range of equivalency of the claims are therefore intended to be embraced therein.

What is claimed is:

1. A reel pipelaying vessel, comprising a reel mounted thereon and pipe conditioning means located downstream of the reel in the direction of unspooling, said pipe conditioning means, including:
    radius control means for imparting a substantially uniform curvature to the pipe after it is unspooled from the reel;
    straightening means for imparting a reverse bending force to the pipe opposite the curvature imparted by said radius control means, said straightening means having a plurality of reaction means for exerting relatively opposed reaction forces on the pipe; and
    means for cooperatively adjusting the radius control means and straightening means relative to the nominal pipe path to adjust the pipe support surfaces of the radius control means and straightening means relative to the pipe path, to thereby maintain the pipe path at the exit end of the straightening means substantially the same for different pipe diameters whereby pipe exiting the straightening means is optimally subject to substantially no net bending stresses and substantially no net residual bending strains.

2. The reel pipe laying vessel according to claim 1, further comprising means for pivoting the pipe conditioning means about a pivot axis substantially parallel to the rotational axis of the reel to adjust the pipe entry angle at which pipe enters the water after passing through said pipe conditioning means.

3. The reel pipe laying vessel according to claim 1, wherein the pipe conditioning means further comprises:
    level wind means mounting said radius control means, straightening means and pipe guide means; and
    means for moving said level wind means in a direction substantially parallel to the rotational axis of the reel.

4. The reel pipe laying vessel according to claim 3, wherein the straightener means comprises three reaction means for exerting a reverse bending force on the pipe, wherein the second or middle reaction means exerts a force on the pipe in a substantially opposite direction from reaction forces exerted on the pipe by the first and third reaction means, said second reaction means being adjustable in a direction substantially perpendicular to the nominal pipe path through the straightening means, and said first reaction means being coupled to said radius control means for movement therewith, such that the first reaction means is adjustable relative to the second and third reaction means to maintain the pipe path at the exit end of the straightener means substantially the same for different pipe diameters and pipe entry angles.

5. A reel pipe laying vessel according to claim 3, wherein said pipe conditioning means further comprises:
    a support ramp assembly pivotably mounted to the vessel; and
    means mounting said level wind means to said support ramp assembly;
    wherein said means for pivoting the pipe handling and conditioning means comprises means for pivoting the support ramp assembly about its pivot axis to vary its angle relative to the water.

6. The reel pipelaying vessel according to claim 5, wherein said level wind mounting means comprises a plurality of transverse tracks located on said support ramp assembly and a corresponding plurality of roller carriages mounted to said level wind means and substantially surrounding the corresponding tracks on the support ramp assembly.

7. A reel pipelaying vessel according to claim 1, further comprising:
    tensioner means located downstream of the straightener means in the direction of unspooling to exert a desired tension on the pipe during a lay operation.

8. The reel pipelaying vessel according to claim 7, wherein the tensioner means comprises a further reaction means located on the opposite side of the pipe path from the downstream most one of said straightener reaction means and cooperating therewith apply tension to the pipe passing therebetween.

9. A reel pipelaying vessel according to claim 1, wherein the radius control means has a curved pipe supporting surface and the ratio of the radius of curvature of the pipe supporting surface to the radius of curvature of the reel hub lies in a range of about 1.2:1.0–1.0:1.2.

10. The reel pipelaying vessel according to claim 7 or 8, further comprising:

first and second tensioner pipe clamping means located forward and aft, respectively, of said tensioner means for clamping pipe passing through said tensioner means against lateral movement relative to the longitudinal pipe path.

11. The reel pipe laying vessel according to claim 1, wherein the radius control means has a curved pipe supporting surface and the ratio of the effective radius of curvature of the pipe supporting surface to the radius of curvature of the reel hub lies in a range of about 1.236:1–1.256.1.

12. The reel pipelaying vessel according to claim 1, wherein the straightener means comprises at least first and second reaction means for exerting a reverse bending force on the pipe substantially opposite the bending force exerted by the radius control means, wherein the second reaction means exerts a force on the pipe in substantially opposite direction from reaction forces exerted on the pipe by the first reaction means, said second reaction means being adjustable in a direction substantially perpendicular to the nominal pipe path through the straightening means, and said first reaction means being coupled to said radius control means for pivotal movement therewith; such that the first reaction means is adjustable relative to the second reaction means to maintain the pipe path at the exit end of the straightener means substantially the same for different pipe diameters and pipe entry angles.

13. The reel pipe laying vessel according to claim 12, further comprising:
means for moving said first reaction means independently of said second reaction means in a direction substantially normal to the nominal pipe path through the straightening means for adjusting said first reaction means toward or away from the pipe path.

14. The reel pipe laying vessel according to claim 12 or 13, further comprising:
means mounting said first reaction means to said radius control means for independent pivotal movement about an axis substantially transverse to the nominal pipe path and substantially parallel to the radius control pivot axis, whereby the first reaction means can continuously follow and conform itself to the curvature of the pipe in the longitudinal direction.

15. The reel pipe laying vessel according to claim 1 or 12, wherein said pipe handling and conditioning means further comprises:
main pipe clamp means located along the pipe path between said straightening means and said pipe guide means for clamping pipe along the nominal pipe path under substantial longitudinal tension; and
means mounting said main pipe clamp means for movement in a first plane substantially perpendicular to the nominal pipe path and in a second plane containing said nominal pipe path.

16. The reel pipe laying vessel according to claim 15, wherein said main pipe clamp mounting means comprises first and second adjusting means coupled to the forward and aft portions of said main pipe clamp means, said first and second adjusting means being independently adjustable for moving said main pipe clamp means in one or both of said first and second planes.

17. The reel pipe laying vessel according to claim 16, wherein said first and second adjusting means comprise laterally spaced pairs of independently adjustable hydraulic cylinders.

18. The reel pipe laying vessel according to claim 15, further comprising:

pipe tie-in clamping means located between said main pipe clamp means and said straightener means for clamping and aligning abutting pipe ends; and
means mounting said tie-in clamp means for movement in a plane substantially perpendicular to the nominal pipe path.

19. The reel pipe laying vessel according to claim 18, wherein said tie-in clamp mounting means comprises a laterally spaced pair of independently adjustable hydraulic cylinders coupled to said tie-in clamp means.

20. The reel pipe laying vessel according to claim 1, 2 or 12, wherein said pipe guide means comprises:
support roller means for supporting the pipe along the nominal pipe path adjacent the aft part of the pipe handling and conditioning means; and
means mounting said support roller means for pivotal movement about a plurality of independent pivot axes.

21. The reel pipe laying vessel according to claim 20, wherein:
said support roller mounting means comprises: base means, and
a roller carriage pivotably mounted to said base means for rotational movement about a carriage pivot axis extending transversely of said nominal pipe path; and
said support roller means comprises:
first and second pairs of rollers,
first roller support means mounting said first pair of rollers to said roller carriage for rotational movement about a first pivot axis substantially parallel to and forward of said carriage pivot axis, and
second roller support means mounting said second pair of rollers to said roller carriage for rotational movement about a second pivot axis substantially parallel and aft of said carriage pivot axis.

22. The reel pipe laying vessel according to claim 21, further comprising:
means mounting said base means for rotational movement about a pivot axis substantially parallel to said carriage pivot axis as a function of pipe loads exerted on said pipe guide means; and
means engaging said base means for measuring said pipe loads exerted on said pipe guide means.

23. The reel pipe laying vessel according to claim 1, 2 or 12, further comprising means for measuring the angle of the pipe with respect to said pipe handling and conditioning means aft of said pipe guide means.

24. The reel pipe laying vessel according to claim 23, wherein said angle measuring means comprises a base member mounted to said pipe guide means and a follower arm mounted to said base member for rotational movement about a pivot axis normal to the nominal pipe path along and through said pipe handling and conditioning means, whereby said follower arm rides on said pipe to detect the angle said pipe makes with respect to said pipe handling and conditioning means.

25. The reel pipe laying vessel according to claim 1, wherein the angle of said pipe handling and conditioning means with a horizontal plane nominally representing the water surface plane is adjustable between about 18° and 60°, as a function of at least water depth along the pipe line right of way and diameter of the pipe to be laid.

26. The reel pipe laying vessel according to claim 25, wherein when the vessel is transiting in a non-pipe laying mode, the angle of said pipe handling and conditioning means with said horizontal plane is set at about 30°.

* * * * *

UNITED STATES PATENT AND TRADEMARK OFFICE
CERTIFICATE OF CORRECTION

PATENT NO.   : 4,345,855

DATED         : August 24, 1982

INVENTOR(S) : Uyeda et al

It is certified that error appears in the above-identified patent and that said Letters Patent is hereby corrected as shown below:

Column 1, line 10, change "expressely" to --expressly--.

Column 3, line 27, change "Gorne" to --Goren--.

Column 10, line 26, change "consequent" to --consequence--.

Column 17, line 56, change "contemplate" to --contemplated--.

Column 21, line 59, change "controlelr" to --controller--.

Column 22, line 51, after "length" delete --(--.

Column 25, line 32, after "530a" change "." to --,--.

Column 28, line 13, change "offer doffshore operations" to --offer difficulty in supporting offshore operations--.

Column 28, line 57, change "sterm" to --stern--.

Column 29, line 32, change "towel" to --towed--.

Column 30, line 7, after "claim 1" insert --or 2--.

Denotes mistakes not the fault of the Patent Office.

UNITED STATES PATENT AND TRADEMARK OFFICE
CERTIFICATE OF CORRECTION

PATENT NO. : 4,345,855

DATED : August 24, 1982

INVENTOR(S) : Uyeda et al

It is certified that error appears in the above-identified patent and that said Letters Patent is hereby corrected as shown below:

Column 31, line 10, change "1.256.1" to --1.256:1--.

Column 31, line 45, after "claim 1" insert --,2--.

Column 32, line 58, change "1" to --2--.

Signed and Sealed this

Fifth Day of July 1983

[SEAL]

Attest:

GERALD J. MOSSINGHOFF

Attesting Officer

Commissioner of Patents and Trademarks